US012239582B2

(12) United States Patent
Patmore et al.

(10) Patent No.: US 12,239,582 B2
(45) **Date of Patent: *Mar. 4, 2025**

(54) PATIENT TRANSPORT APPARATUS HAVING POWERED DRIVE SYSTEM UTILIZING DUAL MODE USER INPUT CONTROL

(71) Applicant: Stryker Corporation, Kalamazoo, MI (US)

(72) Inventors: Kevin M. Patmore, Plainwell, MI (US); Krishna Sandeep Bhimavarapu, Kalamazoo, MI (US); Jeffrey S. Dunfee, II, Kalamazoo, MI (US); Fanqi Meng, Bentonville, AR (US); Christopher J. Hopper, Kalamazoo, MI (US); Thomas A Puvogel, Kalamazoo, MI (US); Gregory S. Taylor, Kalamazoo, MI (US); Ryan Ross, New Carlisle, IN (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,059

(22) Filed: Sep. 28, 2023

(65) Prior Publication Data

US 2024/0016672 A1 Jan. 18, 2024

Related U.S. Application Data

(63) Continuation of application No. 17/839,884, filed on Jun. 14, 2022, now Pat. No. 11,806,284, which is a (Continued)

(51) Int. Cl.

*A61G 1/02* (2006.01)
*A61G 7/05* (2006.01)

(52) U.S. Cl.

CPC ......... *A61G 1/0275* (2013.01); *A61G 1/0243* (2013.01); *A61G 1/0268* (2013.01);
(Continued)

(58) Field of Classification Search

CPC .. A61G 1/0275; A61G 1/0243; A61G 1/0268; A61G 1/0281; A61G 7/0528;
(Continued)

(56) References Cited

U.S. PATENT DOCUMENTS 4,339,013 A 7/1982 Weigt
5,083,625 A 1/1992 Bleicher
(Continued)

FOREIGN PATENT DOCUMENTS

EP 0630637 12/1994
EP 0630637 B1 12/1998
(Continued)

OTHER PUBLICATIONS

9to5 Google, "Nest's 3rd Generation Thermostat Gets Some New Views for Its Farsight Feature", https://9to5google.com/2016/06/14/nest-3rd-gen-thermostat-views-farsight/, Jun. 14, 2016, 4 pages.
(Continued)

*Primary Examiner* — Kevin Hurley
*Assistant Examiner* — Marlon A Arce
(74) *Attorney, Agent, or Firm* — Howard & Howard Attorneys PLLC

(57) ABSTRACT

Systems for facilitating movement of a patient transport apparatus are provided and include user input control device that includes a mode switch selectable between a longitudinal transport mode and a multidirectional mode and a driving assist device actuatable between at least one engaged state and a non-engaged state. The mode switch generates signals based on the selected mode and the driving assist device generates engaged or non-engaged signals which are
(Continued)

received by a controller. The controller is configured to generate an output signal sent to a lift actuator, swivel actuator, and/or a powered drive system to assist a user in propelling the apparatus in a desired manner.

19 Claims, 17 Drawing Sheets

Related U.S. Application Data continuation of application No. 16/369,125, filed on Mar. 29, 2019, now Pat. No. 11,389,348.

(60) Provisional application No. 62/649,790, filed on Mar. 29, 2018.

(52) U.S. Cl.
CPC ......... *A61G 1/0281* (2013.01); *A61G 7/0528* (2016.11); *A61G 2203/14* (2013.01); *A61G 2203/16* (2013.01); *A61G 2203/22* (2013.01)

(58) Field of Classification Search
CPC ............ A61G 2203/14; A61G 2203/16; A61G 2203/22; A61G 2203/32; A61G 2203/30
See application file for complete search history.

(56) References Cited

U.S. PATENT DOCUMENTS

| | | | | |
|---|---|---|---|---|
| 5,690,185 | A | 11/1997 | Sengel | |
| 7,533,892 | B2 | 5/2009 | Schena et al. | |
| 7,882,582 | B2 | 2/2011 | Kappeler et al. | |
| 8,720,616 | B2 | 5/2014 | Kofoed et al. | |
| 10,004,651 | B2 | 6/2018 | DeLuca et al. | |
| 10,045,893 | B2 | 8/2018 | Childs et al. | |
| 10,507,148 | B2 | 12/2019 | Johnson et al. | |
| 10,799,403 | B2 | 10/2020 | Paul et al. | |
| 10,945,902 | B2 | 3/2021 | Paul et al. | |
| 11,071,662 | B2 | 7/2021 | Derenne et al. | |
| 11,234,872 | B2 | 2/2022 | Phan et al. | |
| 11,389,348 | B2 | 7/2022 | Patmore et al. | |
| 12,016,677 | B2 * | 6/2024 | Durlach ................ | A61G 7/001 |
| 2003/0159861 | A1 | 8/2003 | Hopper et al. | |
| 2003/0183427 | A1 | 10/2003 | Tojo et al. | |
| 2006/0102392 | A1 | 5/2006 | Johnson et al. | |
| 2007/0157385 | A1 * | 7/2007 | Lemire ................ | A61G 7/0524 5/618 |
| 2009/0153370 | A1 | 6/2009 | Cooper et al. | |
| 2011/0154569 | A1 | 6/2011 | Wiggers et al. | |
| 2014/0076644 | A1 | 3/2014 | Derenne et al. | |
| 2014/0094990 | A1 | 4/2014 | Hyde et al. | |
| 2015/0297439 | A1 | 10/2015 | Karlovich | |
| 2016/0052137 | A1 | 2/2016 | Hyde et al. | |
| 2016/0052139 | A1 | 2/2016 | Hyde et al. | |
| 2016/0089283 | A1 | 3/2016 | DeLuca et al. | |
| 2016/0270988 | A1 | 9/2016 | Diaz-Flores et al. | |
| 2016/0367415 | A1 | 12/2016 | Hayes et al. | |
| 2017/0119607 | A1 | 5/2017 | Derenne et al. | |
| 2018/0250178 | A1 | 9/2018 | Paul et al. | |
| 2018/0252535 | A1 | 9/2018 | Bhimavarapu et al. | |
| 2018/0289567 | A1 | 10/2018 | Childs et al. | |
| 2018/0369039 | A1 | 12/2018 | Bhimavarapu et al. | |
| 2019/0201256 | A1 * | 7/2019 | Derenne .............. | A61G 7/0528 |
| 2019/0298590 | A1 | 10/2019 | Patmore et al. | |
| 2021/0345977 | A1 | 11/2021 | Kumar | |
| 2022/0304871 | A1 | 9/2022 | Patmore et al. | |
| 2022/0378632 | A1 | 12/2022 | Coulter et al. | |

FOREIGN PATENT DOCUMENTS

| | | | |
|---|---|---|---|
| WO | 2009113009 | A1 | 9/2009 |
| WO | WO2009113009 | | 9/2009 |
| WO | 2012055407 | A1 | 5/2012 |
| WO | WO2012055407 | | 5/2012 |
| WO | 2014187864 | A1 | 11/2014 |
| WO | WO2014187864 | | 11/2014 |

OTHER PUBLICATIONS

English language abstract and machine-assisted English translation for EP 0 630 637 extracted from espacenet.com database on Apr. 18, 2019, 11 pages.
Into Robotics, “2 Simple Methods to Choose Motors for Wheel Drive Robots”, https://www.intorobotics.com/2-simple-methods-choose-motors-wheel-drive-robots/, Oct. 29, 2013, 10 pages.
Lamps Plus, “Deco Dome 17” High On-Off Accent Lamp, https://www.lampsplus.com/products/deco-dome-17-inch-high-touch-on-off-accent- lamp_p6169.html, 2018, 7 pages.
Robo-Rats, “Robo-Rats Locomotion: Differential Drive”, https://groups.csail.mit.edu/drl/courses/cs54-2001s/diffdrive.html; Apr. 4, 2001, 2 pages.
U.S. Appl. No. 16/222,510, filed Dec. 17, 2018.

* cited by examiner

FIG. 10A
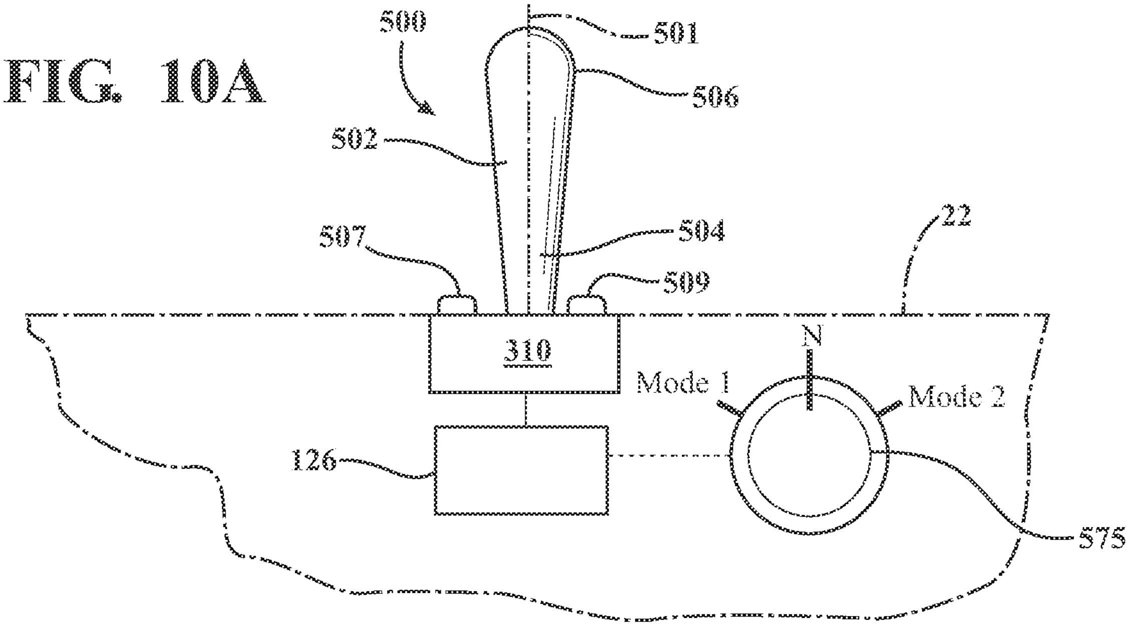
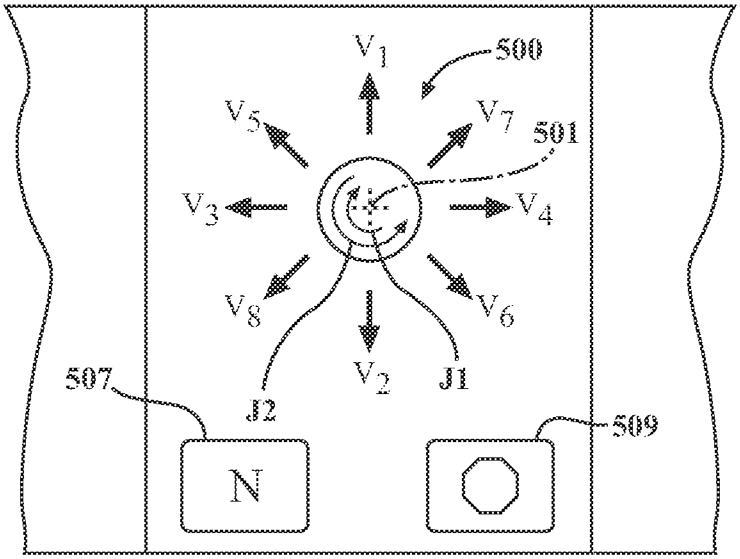
FIG. 10B

PATIENT TRANSPORT APPARATUS HAVING POWERED DRIVE SYSTEM UTILIZING DUAL MODE USER INPUT CONTROL

CROSS-REFERENCE TO RELATED APPLICATIONS

This application is a Continuation of U.S. patent application Ser. No. 17/839,884 filed on Jun. 14, 2022, which is a Continuation of U.S. patent application Ser. No. 16/369,125 filed on Mar. 29, 2019 and issued as U.S. Pat. No. 11,389,348 on Jul. 19, 2022, which claims priority to and all advantages of U.S. Provisional Patent Application No. 62/649,790 filed on Mar. 29, 2018, the disclosures of each of which are hereby incorporated by reference in their entirety.

BACKGROUND

Patient support systems facilitate care of patients in a health care setting. Patient support systems comprise patient transport apparatuses such as hospital beds, stretchers, cots, wheelchairs, and chairs. Conventional patient transport apparatuses comprise a base and a patient support surface upon which the patient is supported.

Often, these patient transport apparatuses have one or more powered devices to perform one or more functions on the patient transport apparatus. These powered devices can include powered drive systems that engage one or more drive wheels to aid the user in moving the patient transport apparatus from one location to another location.

When the user wishes to operate the powered drive system, the user actuates a user input control that is coupled to the powered drive system which assists the user in propelling the patient transport apparatus in a desired direction. Typically, such powered drive systems are configured to propel the patient transport apparatus in a longitudinal direction (forward or rearward) or a lateral direction (leftward or rightward). However, different movements may be desirable in certain situations, such as when the user is moving the patient transport apparatus down long hallways versus moving the patient transport apparatus in small spaces, such as in a patient's room or into an elevator. Often, however, the user input control is unable to differentiate between these situations to appropriately propel the patient transport apparatus.

A patient transport apparatus is desired that addresses one or more of the aforementioned challenges.

BRIEF DESCRIPTION OF THE DRAWINGS

FIG. 9B top view of FIG. 9 with a manual force being applied to the T-bar handle member in a rearward position and the rotatable dial in Mode 1.

FIG. 10A is a perspective view of a user input control and controller according to another embodiment including a joystick.

FIG. 10B is a top view of the joystick of FIG. 10A.

DETAILED DESCRIPTION

Figure 1:
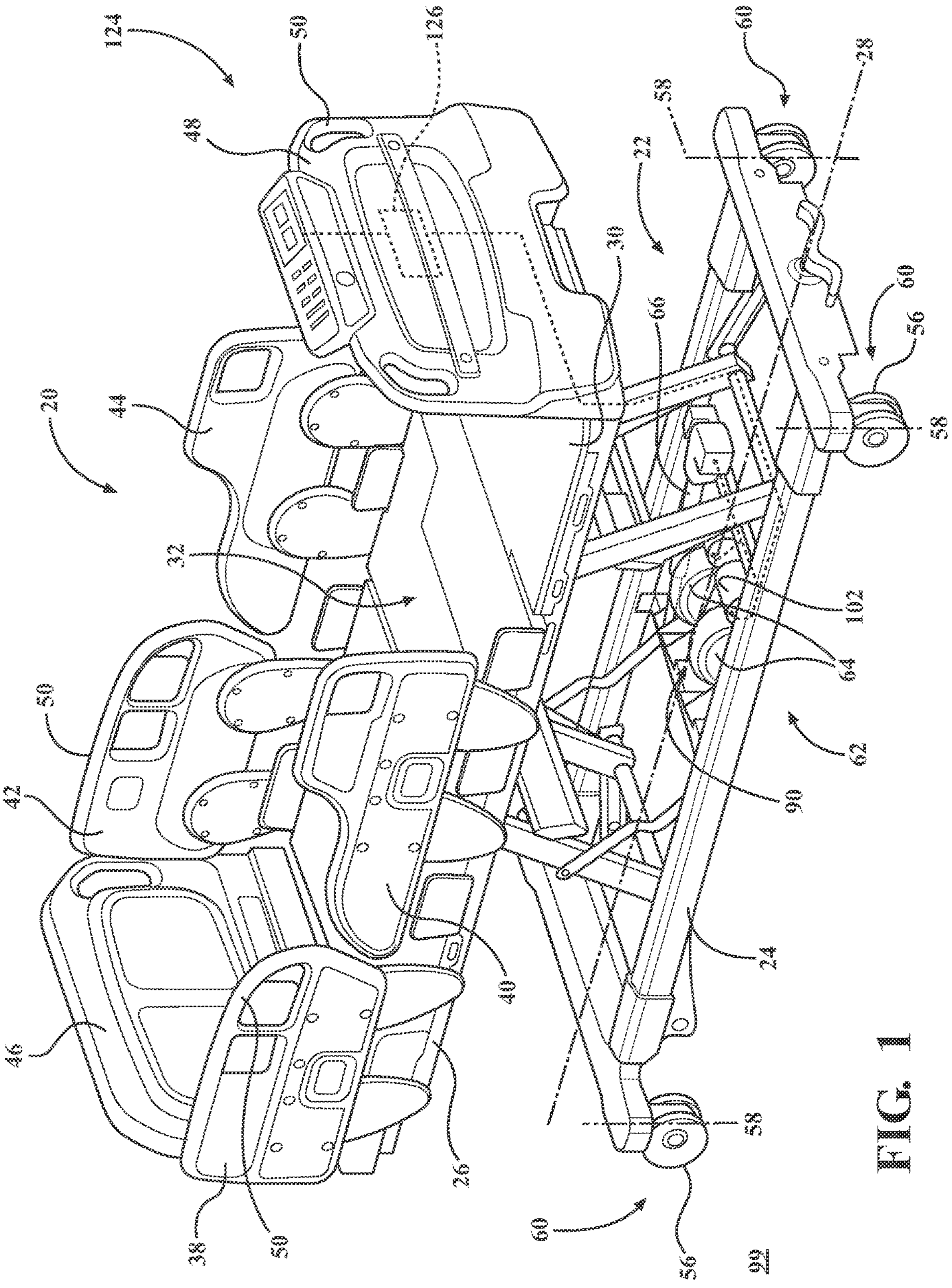
FIG. 1 is a perspective view of a patient transport apparatus.

Referring to FIG. 1, a patient transport system comprising a patient transport apparatus 20 is shown for supporting a patient in a health care setting. The patient transport apparatus 20 illustrated in FIG. 1 comprises a hospital bed. In other embodiments, however, the patient transport apparatus 20 may comprise a cot, wheelchair, chair, or similar apparatus, utilized in the care of a patient to transport the patient between locations.

A support structure 22 provides support for the patient. The support structure 22 illustrated in FIG. 1 comprises a base 24 and an intermediate frame 26. The base 24 defines a longitudinal axis 28 from a head end to a foot end. The intermediate frame 26 is spaced above the base 24. The support structure 22 also comprises a patient support deck 30 disposed on the intermediate frame 26. The patient support deck 30 comprises several sections, some of which articulate (e.g., pivot) relative to the intermediate frame 26, such as a fowler section, a seat section, a thigh section, and a foot section. The patient support deck 30 provides a patient support surface 32 upon which the patient is supported.

A mattress, although not shown, may be disposed on the patient support deck 30. The mattress comprises a secondary patient support surface upon which the patient is supported. The base 24, intermediate frame 26, patient support deck 30, and patient support surface 32 each have a head end and a foot end corresponding to designated placement of the patient's head and feet on the patient transport apparatus 20. The construction of the support structure 22 may take on any known or conventional design, and is not limited to that specifically set forth above. In addition, the mattress may be omitted in certain embodiments, such that the patient rests directly on the patient support surface 32.

Side rails 38, 40, 42, 44 are supported by the base 24 and may be connected to the intermediate frame 26, the patient support deck 30, or any other component of the patient transport apparatus 20. A first side rail 38 is positioned at a right head end of the intermediate frame 26. A second side rail 40 is positioned at a right foot end of the intermediate frame 26. A third side rail 42 is positioned at a left head end of the intermediate frame 26. A fourth side rail 44 is positioned at a left foot end of the intermediate frame 26. If the patient transport apparatus 20 is a stretcher, there may be fewer side rails. The side rails 38, 40, 42, 44 are movable between a raised position in which they block ingress and egress into and out of the patient transport apparatus 20 and a lowered position in which they are not an obstacle to such ingress and egress. The side rails 38, 40, 42, 44 may also be movable to one or more intermediate positions between the raised position and the lowered position. In still other configurations, the patient transport apparatus 20 may not comprise any side rails.

A headboard 46 and a footboard 48 are coupled to the intermediate frame 26. In other embodiments, when the headboard 46 and footboard 48 are provided, the headboard 46 and footboard 48 may be coupled to other locations on the patient transport apparatus 20, such as the base 24. In still other embodiments, the patient transport apparatus 20 does not comprise the headboard 46 and/or the footboard 48. The side rails 38, 40, 42, 44, headboard 46, and footboard 48, or other components of the support structure 22 or intermediate frame 26, may also include manual operator interfaces 50, such as handles or the like to facilitate movement of the patient transport apparatus 20 over the floor surfaces 99.

Support wheels 56 are coupled to the base 24 to support the base 24 on a floor surface 99 such as a hospital floor. The support wheels 56 allow the patient transport apparatus 20 to move in any direction along the floor surface 99 by swiveling to assume a trailing orientation relative to a desired direction of movement. In the embodiment shown, the support wheels 56 comprise four support wheels each arranged in corners of the base 24. The support wheels 56 shown are caster wheels able to rotate and swivel about swivel axes 58 during transport. Each of the support wheels 56 forms part of a caster assembly 60. Each caster assembly 60 is mounted to the base 24. It should be understood that various configurations of the caster assemblies 60 are contemplated.

As best shown in FIGS. 1-3B, the patient transport apparatus 20 also includes a drive wheel assembly 62 that is coupled to the base 24. The drive wheel assembly 62 influences motion of the patient transport apparatus 20 during transportation over the floor surface. The drive wheel assembly 62 comprises at least one drive wheel 64, and also comprises a powered drive system 90 and a lift actuator 66 that are each separately operably coupled to the at least one drive wheel 64.

Figures 2A, 2B, 2C:
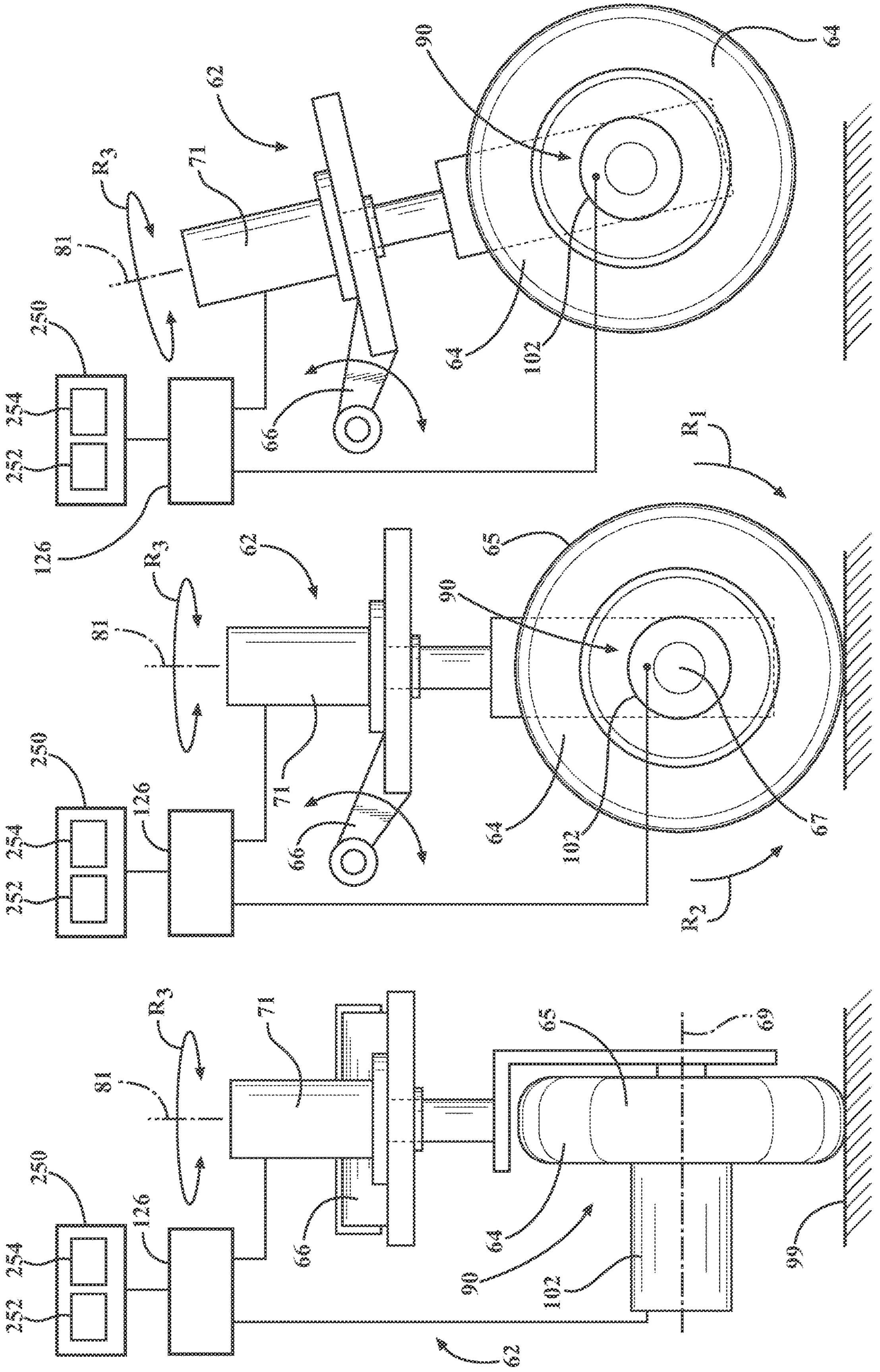
FIG. 2A is a front schematic view of a drive wheel assembly of the patient transport apparatus coupled to a support structure of the patient transport apparatus with a single drive wheel in a deployed position.
FIG. 2B is a side view of FIG. 2A.
FIG. 2C is a side view of FIG. 2A with the drive wheel assembly in a retracted position.

Referring to FIGS. 2A through 2C, each drive wheel 64 includes a circular outer wheel portion 65 that contacts the floor surface 99 and a central hub portion 67 extending inward of the circular outer portion 65, with the central hub portion 67 defining a rotational axis 69 extending parallel to the floor surface 99. The powered drive system 90 is configured to independently drive (e.g. independently rotate) each respective one of the at least one drive wheels 64 in a first rotational direction R1 or a second rotational direction R2 opposite the first rotational direction R1 about the rotational axis 69 and perpendicular to the floor surface 99 to aid the user in moving the patient transport apparatus 20 in a desired direction of travel along the floor surface 99.

Figure 3B:
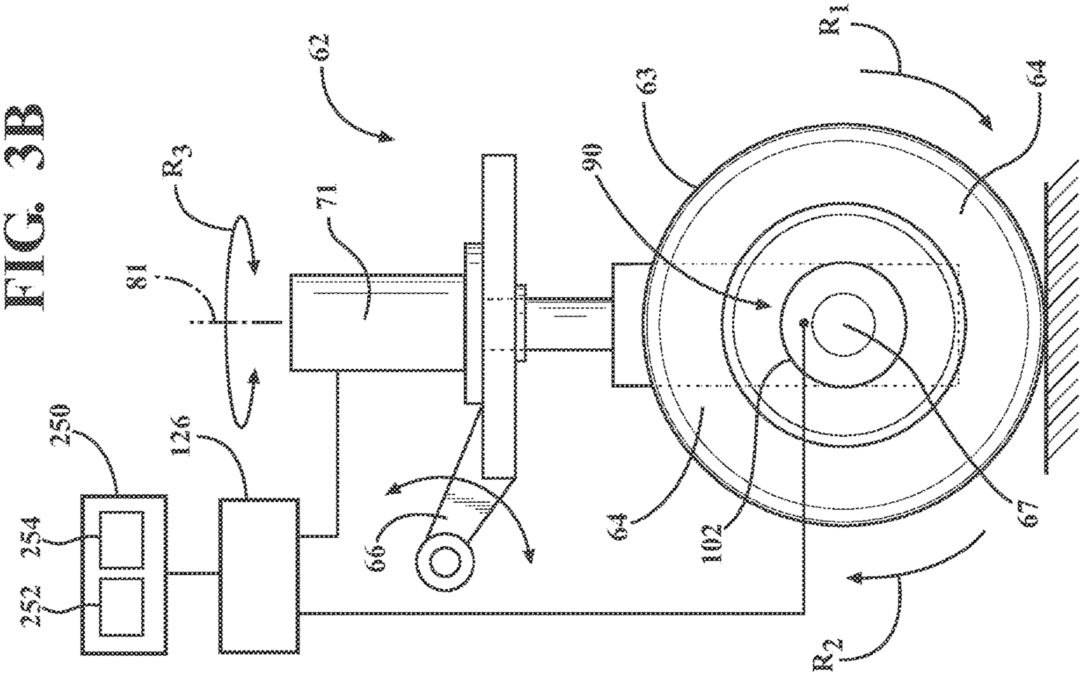
FIG. 3B is a side view of FIG. 3A.
Figure 3A:
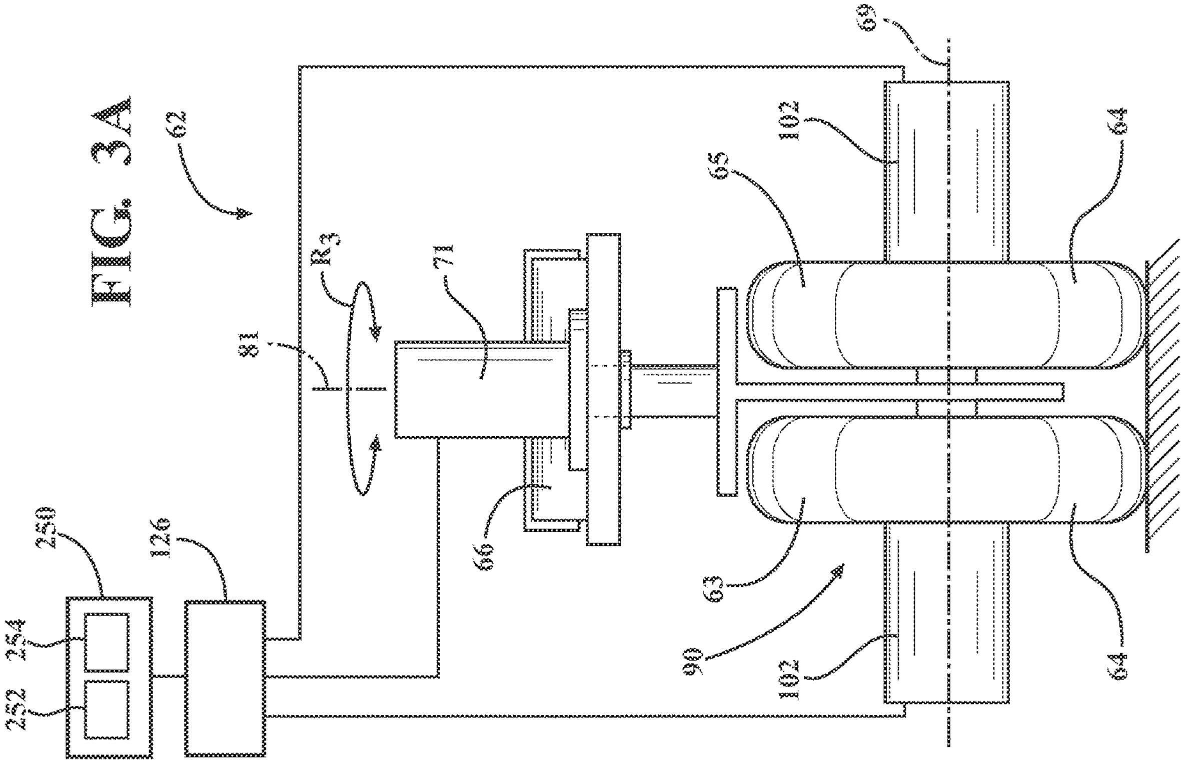
FIG. 3A is a front schematic view of a drive wheel assembly of the patient transport apparatus coupled to a support structure of the patient transport apparatus with a pair of drive wheels in a deployed position.

The at least one drive wheel 64 may be located to be deployed inside or outside a perimeter of the base 24 and/or within or outside a support wheel perimeter defined by the swivel axes 58 of the support wheels 56. In some embodiments, the at least one drive wheel 64 may be located near a center of the support wheel perimeter, or offset from the center. In the embodiment shown in FIGS. 2A-2C, the at least one drive wheel 64 is a single drive wheel 64, while in an alternative embodiment as shown in FIGS. 3A-3B the at least one drive wheel 64 includes a pair of drive wheels 64. Additional drive wheels 64 beyond two drive wheels 64 are also contemplated.

In the embodiments shown in FIGS. 2 and 3, the powered drive system 90 comprises a motor 102 associated with each respective drive wheel 64. Each motor 102 is also coupled to a power source (not shown), such as one or more rechargeable batteries. Electrical power is provided from the power source to energize the motor 102. The motor 102 converts electrical power from the power source to torque supplied to the respective drive wheel 64 to rotate the drive wheel 64 in the first rotational direction R1 or the second rotational direction R2 (shown as clockwise or counter-clockwise in FIGS. 2B and 3B), with the first rotational direction R1 corresponding to movement of the patient transport apparatus 20 in a forward direction (rightward as shown in FIGS. 2B and 3B) and the second rotational direction R2 corresponding to the movement of the patient transport apparatus 20 (leftward as shown in FIGS. 2B and 3B).

In alternative embodiments, a single motor 102 could be utilized with the at least two drive wheels 64, wherein a differential is coupled to a drive shaft of the motor 102 such that the at least two drive wheels 64 may be independently rotated at different speeds, with such an arrangement being desirable wherein the differing rotational speeds of the at least two drive wheels 64 can aid a user in spinning the patient transport apparatus 20 or turning the patient transport apparatus 20.

As also shown in FIGS. 2 and 3, the lift actuator 66 is operably coupled to each respective one of the least one drive wheel 64. The lift actuator 66 is operable to move the at least one drive wheel 64 between a deployed position engaging the floor surface 99 (such as shown in FIGS. 2A, 2B, 3A and 3B) and a retracted position spaced away from and out of contact with the floor surface 99 (represented in a single view as shown in FIG. 2C). It should be appreciated that the lift actuator 66 may comprise one or more rotary actuators, linear actuators, or other suitable actuators, and may be powered electrically, hydraulically, combinations thereof, or in any suitable manner to raise and lower the at least one drive wheel 64. The lift actuator 66 may be fixed to the base 24, pivotally connected to the base 24, connected to the intermediate frame 26, or otherwise coupled to the support structure 22 to retract and deploy the at least one drive wheel 64. The at least one drive wheel 64 thus influences motion of the patient transport apparatus 20 during transportation over the floor surface 99 when the at least one drive wheel 64 is in the deployed position. When the at least one drive wheel 64 is retracted (such as shown in FIGS. 2C and 3C), the patient transport apparatus 20 is limited to movement via the support wheels 56, which are subject to uncontrollable swiveling. In some embodiments, the lift actuator 66 may be absent such that the drive wheels 64 are always deployed and in contact with the floor surface 99.

In certain embodiments, the drive wheel assembly 62 is also swivelable in a rotational direction R3 between a non-swiveled position and one or more swiveled positions about a swivel axis 81, with the swivel axis 81 extending in a direction perpendicular to both the longitudinal axis 28 and the floor surface 99. One or more swivel actuators 71, such as an electric motor or other suitable actuator, may be employed to swivel the drive wheel assembly 62 or portions thereof between the non-swiveled position and the swiveled positions. The swivel actuator 71 may also comprise a clutch employed to enable swiveling of the drive wheels 64 about the swivel axis 81. For example, when the clutch is disengaged or allowed to slip, if two drive wheels 64 are employed (see FIGS. 3A and 3B), they could be counter-rotated to cause such swiveling to a desired orientation and then the clutch can be re-engaged or the drive wheels 64 then driven in a desired common direction. Similarly, instead of counter-rotating the drive wheels 64 to cause such swiveling, the drive wheels 64 may instead be driven the same direction at different speeds to cause such swiveling in some situations.

The non-swiveled position of the drive wheel assembly 62 corresponds to a position of the at least one drive wheel 64 in a plane that is perpendicular to the floor surface 99 and is parallel to or along the longitudinal axis 28 of the patient transport apparatus 20. By contrast, the swiveled positions of the drive wheel assembly 62 corresponds to positions of the at least one drive wheel 64 in a plane that is not parallel to or along the longitudinal axis 28. In this way, the direction of travel of the respective at least one drive wheel 64, and hence the direction of travel of the patient transport apparatus 20, when the respective at least one drive wheel 64 is deployed and being driven by the powered drive system 90 through the motor 102, may change from a direction of travel along the longitudinal axis 28 in a non-swiveled position to a direction of travel that is transverse to the longitudinal axis 28 in a swiveled position. As defined herein, the term "transverse" refers to a direction of travel that is angled with respect to the direction of travel along the longitudinal axis 28 such that a hypothetical travel path of the drive wheel 64 in the swiveled position would lie crosswise to the travel path of the drive wheel 64 along the longitudinal axis 28 in the non-swiveled position. In other words, the transverse direction of travel could be a lateral direction of travel or any direction of travel between a longitudinal direction and a lateral direction. The lateral direction corresponds generally to the direction from one side of the patient transport apparatus 20 to the other side between the head end and foot end and normal to the longitudinal direction.

The patient transport apparatus 20 also includes one or more user input controls 250 (see FIGS. 2A-3B) integrated into the support structure 22 to provide for movement of the patient transport apparatus 20 over floor surfaces 99 via the powered drive system 90 of the drive wheel assembly 62. In certain embodiments, these user input controls 250 may be integrated into one or more of the headboard 46, footboard 48, support structure 22, side rails 38, 40, 42, 44 and/or any other components of the patient transport apparatus 20, including, for example, along IV poles associated with the patient transport apparatus 20.

In certain embodiments, each user input control 250 includes a mode switch 252 and a driving assist device 254 as described in more detail below. The mode switch 252 is selectable between a longitudinal transport mode (i.e., a first mode) and a multidirectional mode (i.e., a second mode) and may also comprise a neutral mode (also referred to as a manual mode). The mode switch 252 is configured to generate a first signal corresponding to the selected longitudinal transport mode and a second signal corresponding to the selected multidirectional mode. The mode switch 252 is also configured to generate a neutral signal corresponding to the neutral mode, when present, or may alternatively generate no signal when in the neutral mode. In the neutral mode, the neutral signal may be sent to a controller 126, described further below, which then commands the lift actuator 66 to retract the at least one drive wheel 64 so that the user can move the patient transport apparatus 20 manually.

The terms "first mode" and "second mode", as it relates to the longitudinal transport mode and multidirectional mode, is not meant to imply any order of selection. Accordingly, the longitudinal transport mode could also be alternatively designated as the second mode, while the multidirectional mode could be designated as the first mode.

The driving assist device 254 is actuatable between at least one engaged state and a non-engaged state and is configured to also generate a corresponding engaged signal when the driving assist device 254 is in one of the at least one engaged states, and a non-engaged signal when the driving assist device 254 is in the non-engaged state, or may alternatively generate no signal when in the non-engaged state.

The terms "longitudinal transport mode" and "multidirectional mode", as it relates to the mode switch 252 and the driving assist device 254, refers to the state and/or operation of the lift actuator 66, the swivel actuator 71, and/or the powered drive system 90 of the drive wheel assembly 62 to provide powered movement for aiding a user in moving the patient transport apparatus 20 in a desired manner. It should of course be understood, that the patient transport apparatus 20, in some embodiments, can also be moved manually, without power assistance, such as in the neutral mode in which the lift actuator 66 has retracted the at least one drive wheel 64 from the floor surface 99.

Figure 4:
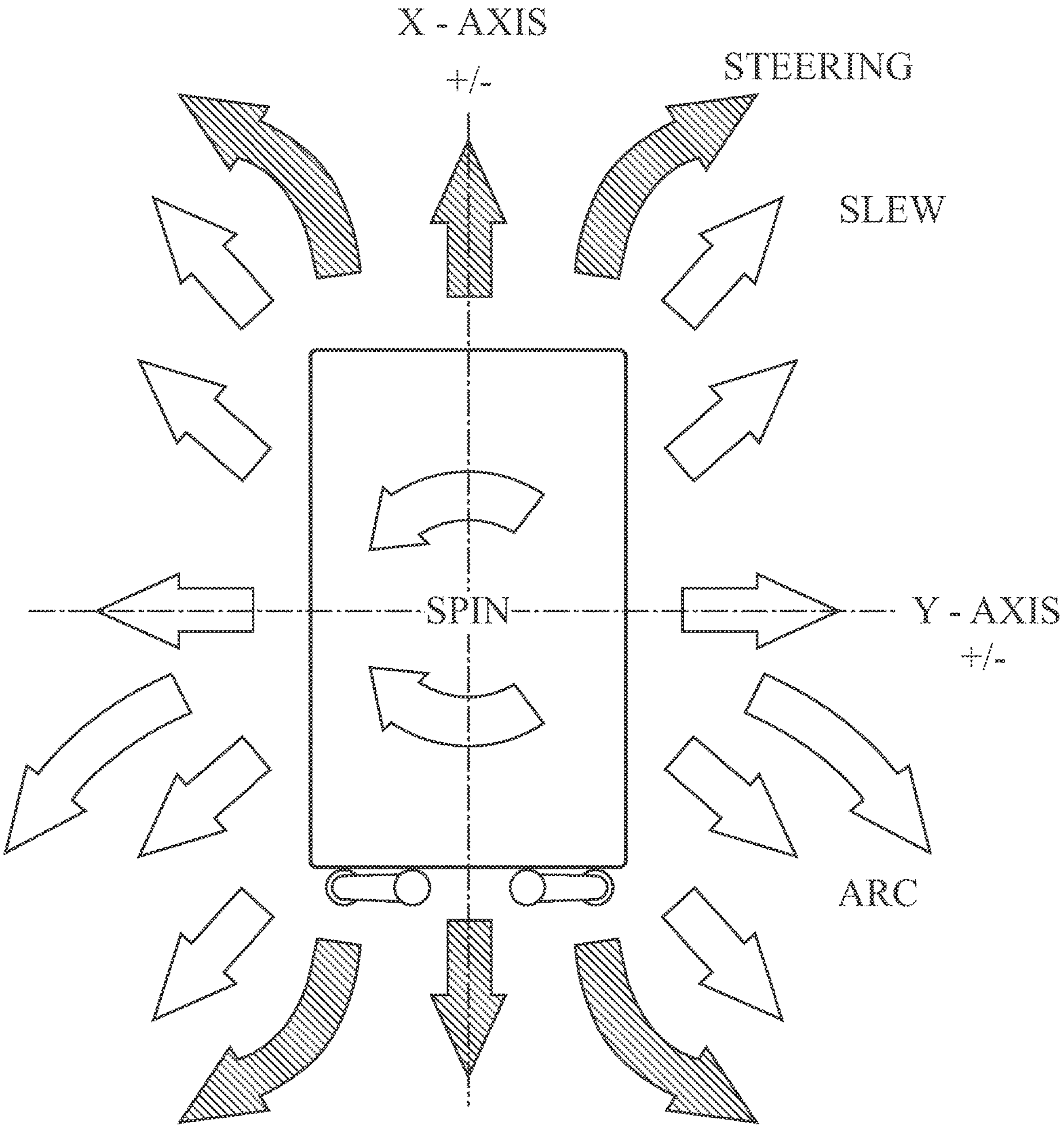
FIG. 4 is a schematic illustration of movements enabled in a longitudinal transport mode and a multidirectional mode.

The selection of the longitudinal transport mode on the mode switch 252 provides the first signal that is received by the controller 126, which in turn sends one or more first output signals (first commands) to the lift actuator 66, swivel actuator 71, and/or powered drive system 90 corresponding to the first signal to position the at least one drive wheel 64 to facilitate movement of the patient transport apparatus 20 in a linear direction along or parallel to the longitudinal axis 28 (i.e., in the longitudinal direction) when the powered drive system 90 is engaged. The longitudinal transport mode may be advantageous in situations where the user needs to move the patient transport apparatus 20 down long, straight hallways and wishes to prevent dog-tracking or other inadvertent lateral movement of the patient transport apparatus 20. When the mode switch 252 is in the longitudinal transport mode, the drive wheel assembly 62 is controlled by the controller 126 to limit powered movement to longitudinal directions, i.e., by restricting powered lateral and/or rotational movements. It should be appreciated that the user can still steer the patient transport apparatus 20 in the longitudinal transport mode by simply applying manual steering forces on the patient transport apparatus 20 while in the longitudinal transport mode. In this case, however, the powered movement is still only being applied in the longitudinal direction of the patient transport apparatus 20. Moreover, in certain embodiments, the longitudinal transport mode also provides power assisted steering/turning of the patient transport apparatus 20, such as around corners and the like, so long as the patient transport apparatus 20 is moving in the direction of its longitudinal axis 28. FIG. 4 illustrates the longitudinal movements and steering/turning movements to which the patient transport apparatus 20 is limited in the longitudinal transport mode (see cross-hatched movements).

The selection of the multidirectional mode on the mode switch 252 provides the second signal that is received by the controller 126, which in turn sends one or more second output signals (second commands) to the lift actuator 66, the swivel actuator 71, and/or the powered drive system 90 corresponding to the second signal to position the at least one drive wheel 64 to facilitate movement of the patient transport apparatus 20 in multiple directions, e.g., in the longitudinal direction, transverse directions, clockwise or counterclockwise rotational directions (such as spinning the patient transport apparatus 20 about a virtual center axis), arcing directions, slewing directions, combinations thereof, and the like. The patient transport apparatus 20 may be capable of any form or combination of movements in the multidirectional mode. Some possible movements of the patient transport apparatus 20 are described in U.S. Patent Application Publication No. 2016/0089283, filed on Dec. 10, 2015, entitled, "Patient Support Apparatus", the entire contents of which are hereby incorporated by reference. The multidirectional mode may be advantageous to enable a user to more easily maneuver the patient transport apparatus 20 in small spaces, such as into and out of elevators, patient rooms, and the like, with power assistance. An example of the types of movements that are possible in one embodiment of the multidirectional mode are shown in FIG. 4.

The mode switch 252 and driving assist device 254 are each coupled to the controller 126. The controller 126 is also coupled to the powered drive system 90, swivel actuator 71, and lift actuator 66 of the drive wheel assembly 62 (see FIG. 13). The controller 126 operates the powered drive system 90, swivel actuator 71, and/or lift actuator 66 according to the signals received from the mode switch 252 and the signals received from the driving assist device 254. More specifically, the controller 126 permits or restricts rotation of the at least one drive wheel 64 about the rotational axis 69, lifts/lowers the lift actuator 66 (and drive wheels 64), and/or swivels the at least one drive wheel 64 about the swivel axis 81 or restricts such swiveling, based on the generated signals received from the mode switch 252 and based on the signals received from the driving assist device 254. Further, the controller 126 is also configured, in certain circumstances, to decide whether to operate the powered drive system 90 on the basis of the signals as described above, thus either allowing power assist or allowing a user to transport the patient transport apparatus 20 without power assist.

In each of these embodiments, when the mode switch 252 is in the longitudinal transport mode, the controller 126 permits rotation of the at least one drive wheel 64 about the rotational axis 69 at the maximum allowable power assisted speed, such as about 6 miles per hour (about 10 kilometers per hour). Other maximum speeds are also contemplated. When the mode switch 252 is in the multidirectional mode, the controller 126 permits rotation of the at least one drive wheel 64 about the rotational axis 69 at a rotational speed that is substantially less than the maximum allowable power assisted speed in the longitudinal transport mode. In certain embodiments, the maximum allowable power assisted speed in the multidirectional mode is about one quarter of the maximum allowable power assisted speed in the longitudinal transport mode, or around 1.5 miles per hour (about 2.5 kilometers per hour). Other maximum speeds for the multidirectional mode are also contemplated.

A sensor system may be provided to indicate current positions of the at least one drive wheel 64 to the controller 126. The sensor system may comprise sensors S in the lift actuator 66, the swivel actuator 71, and/or the powered drive system 90 that indicate whether the at least one drive wheel 64 is deployed or retracted, a current orientation of the at least one drive wheel 64 about swivel axis 81, and a current rotational speed of the at least one drive wheel 64. The sensors S may be limit switches, reed switches, hall-effect sensors, speed sensors, inertial sensors such as accelerometers and/or gyroscopes, and the like. Feedback from these sensors S can be used by the controller 126 to properly position the drive wheels 64 as desired, i.e., in the desired deployed/retracted state, the desired orientation, and/or at the desired rotational speed.

The controller 126 includes memory 127. Memory 127 may be any memory suitable for storage of data and computer-readable instructions. For example, the memory 127 may be a local memory, an external memory, or a cloud-based memory embodied as random access memory (RAM), non-volatile RAM (NVRAM), flash memory, or any other suitable form of memory. The controller 126 comprises one or more microprocessors for processing instructions or for processing an algorithm stored in memory to control operation of the lift actuator 66, the swivel actuator 71, and the powered drive system 90. Additionally or alternatively, the controller 126 may comprise one or more microcontrollers, field programmable gate arrays, systems on a chip, discrete circuitry, and/or other suitable hardware, software, or firmware that is capable of carrying out the functions described herein. The controller 126 may be carried on-board the patient transport apparatus 20, or may be remotely located. In one embodiment, the controller 126 is mounted to the base 24. The controller 126 may comprise one or more subcontrollers configured to control the lift actuator 66, the swivel actuator 71, or the powered drive system 90, or one or more subcontrollers for each of the lift actuator 66, the swivel actuator 71, and the powered drive system 90. In some cases, one of the subcontrollers may be attached to the intermediate frame 26 with another attached to the base 24. Power to the lift actuator 66, the swivel actuator 71, the powered drive system 90, and/or the controller 126 may be provided by a battery power supply. The controller 126 may communicate with the lift actuator 66, the swivel actuator 71, and the powered drive system 90 via wired or wireless connections. The controller 126 generates and transmits output signals (commands) to the lift actuator 66, the swivel actuator 71, and the powered drive system 90, or components thereof, to operate the lift actuator 66, the swivel actuator 71, and the powered drive system 90 to perform one or more desired functions.

In one embodiment, the controller 126 comprises an internal clock to keep track of time. In one embodiment, the internal clock is a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both. In some embodiments, the memory 127, microprocessors, and microcontroller clock cooperate to send signals to the lift actuator 66, swivel actuator 71, and the powered drive system 90 to meet predetermined timing parameters.

Figure 4A:
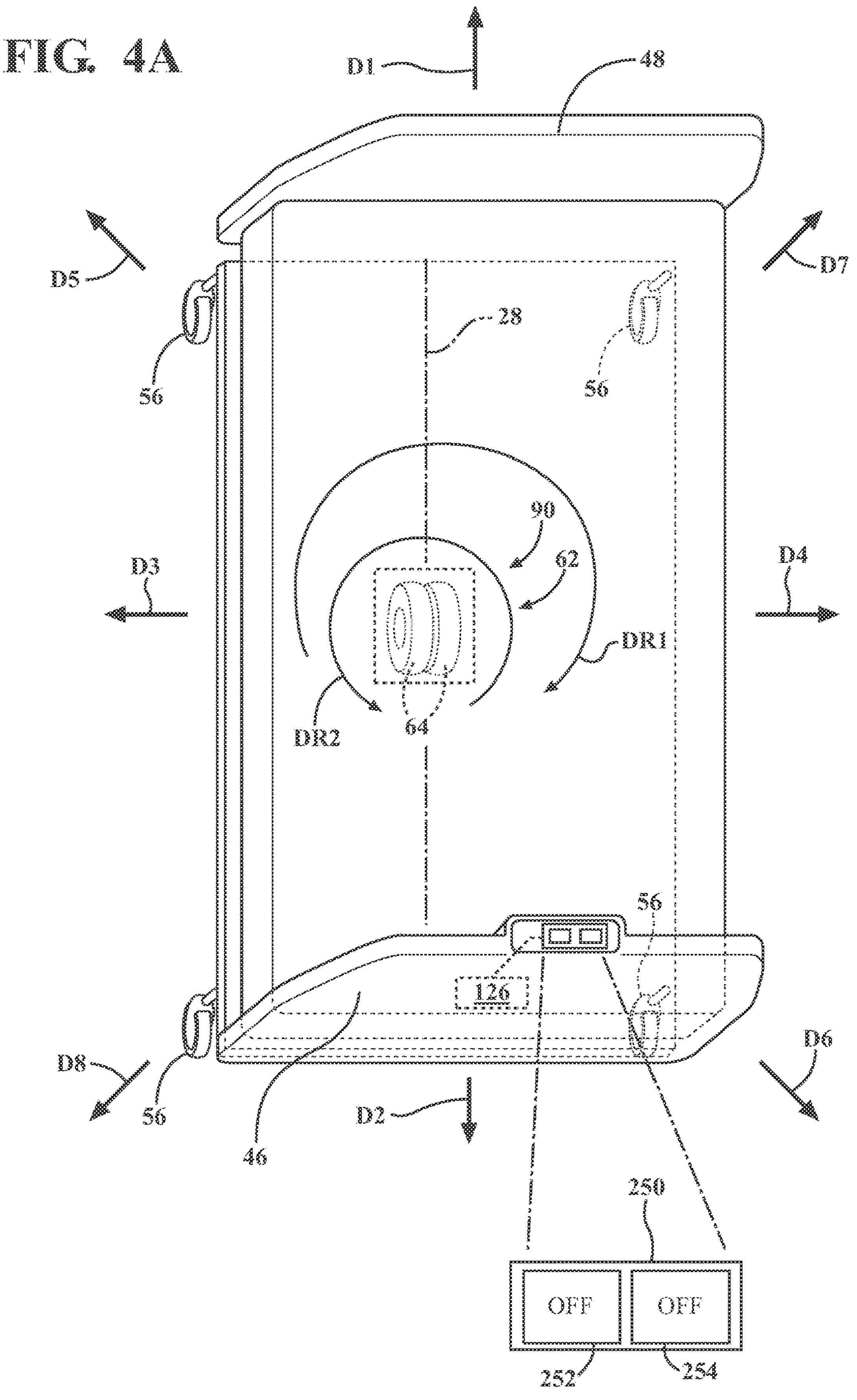
FIG. 4A is a schematic illustration of a portion of the patient transport apparatus with the drive wheel assembly having two wheels in the retracted position including directional representations of the manual movement of the patient transport apparatus by a user.
Figure 4B:
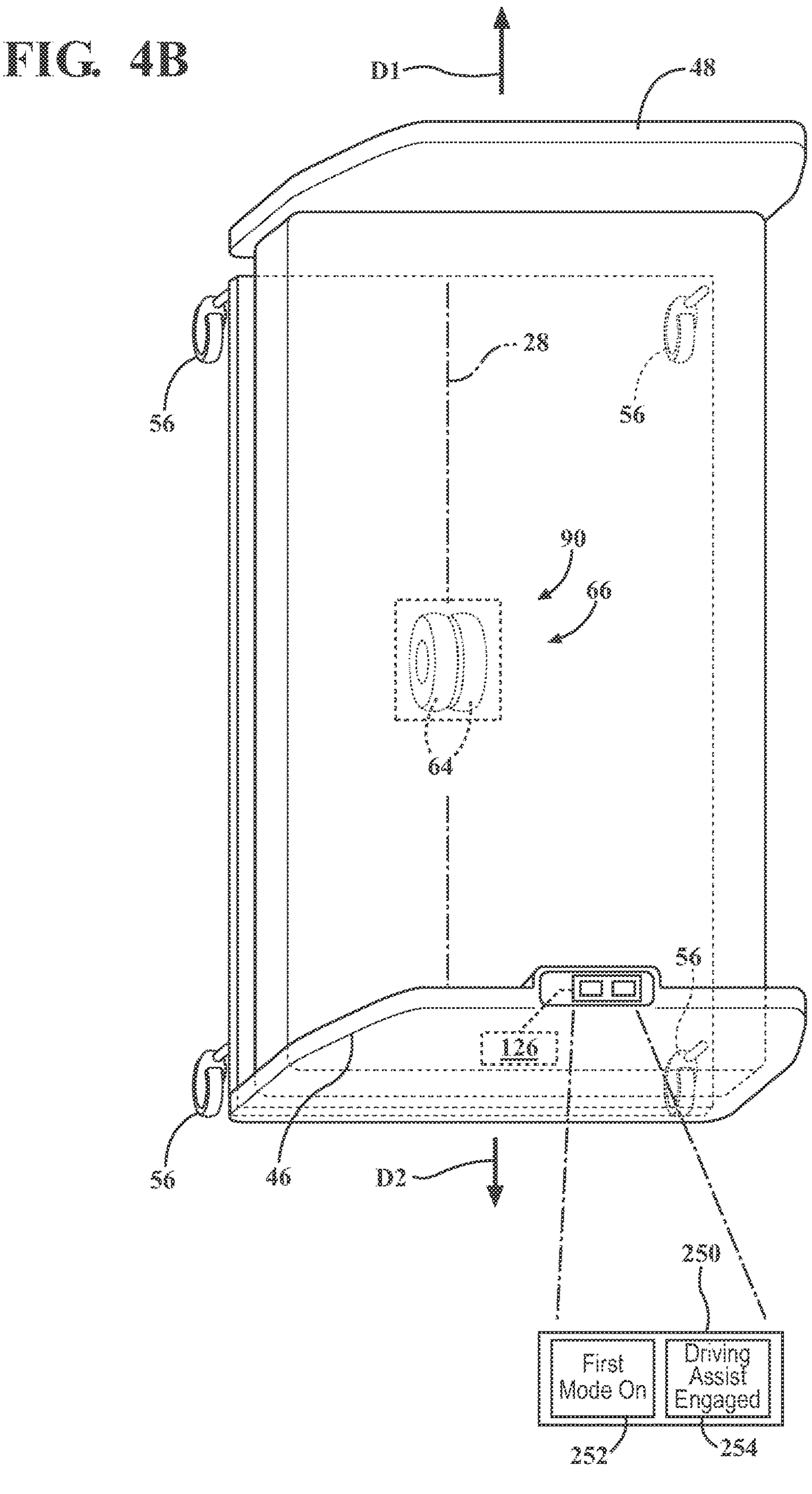
FIG. 4B is a schematic illustration of a portion of the patient transport apparatus with the drive wheel assembly having two wheels in the deployed position and the user input control in the longitudinal transport mode including directional representations of the power assisted movement of the patient transport apparatus.
Figure 4C:
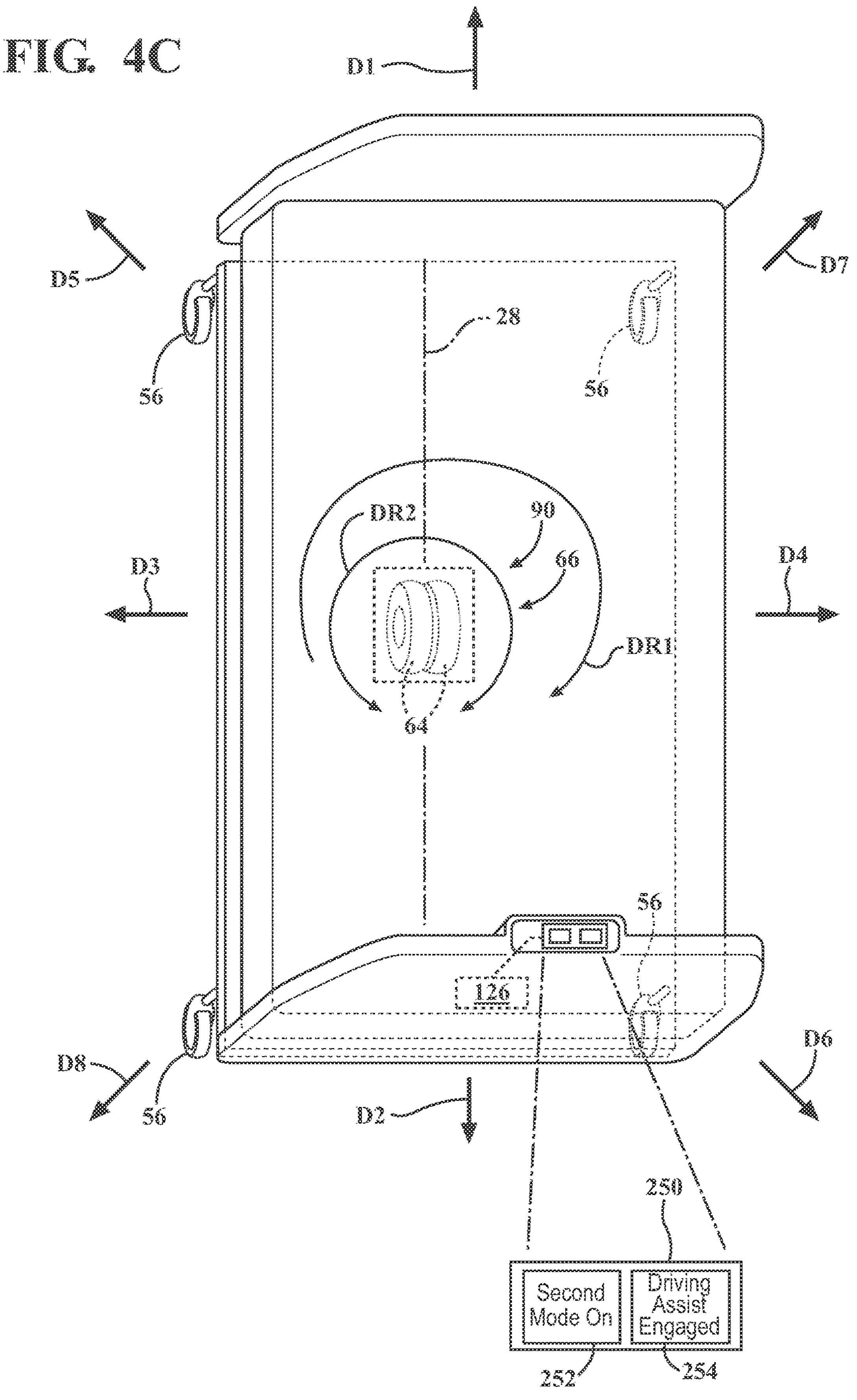
FIG. 4C is a schematic illustration of a portion of the patient transport apparatus with the drive wheel assembly having two wheels in the deployed position and the user input control in the multidirectional mode including directional representations of the power assisted movement of the patient transport apparatus.

FIGS. 4A, 4B, and 4C provided schematic illustrations, in a general sense, of how the user input control 250 is integrated into the patient transport apparatus 20 and is utilized to aid a user in the movement of patient transport apparatus 20. As shown schematically in FIGS. 4A, 4B, and 4C, the patient transport apparatus 20 includes the user input control 250 integrated into the headboard 46 of the patient transport apparatus 20 opposite the footboard 48, and also illustrates the longitudinal axis 28 as a point of reference. The user input control 250 may comprise any suitable user interface, including those described further below, and may comprise handles, dials, joysticks, etc. The user input control 250 is schematically represented in FIGS. 4A, 4B, 4C for illustration purposes.

In FIG. 4A, the longitudinal transport mode or multidirectional mode for the mode switch 252 has not been selected (illustrated as "OFF in FIG. 4A) and the driving assist device 254 has not been engaged (illustrated as "OFF in FIG. 4A). Accordingly, a neutral signal is generated by the mode switch 252 and sent to the controller 126 (or the mode switch 252 sends no signal to the controller 126) and a non-engaged signal is generated by the driving assist device 254 and sent to the controller 126 (or the driving assist device 254 sends no signal to the controller 126). The controller 126 receives the neutral signal and non-engaged signal (or recognizes the lack of signals). The controller 126 may then generate one or more corresponding output signals (commands) that is received by the lift actuator 66 and/or the powered drive system 90, in which the lift actuator 66 places or confirms the placement of the drive wheel 64 in the retracted position and/or wherein the powered drive system 90 stops the motor 102 and/or confirms that the motor 102 is not operational to prevent the motor 102 from engaging (i.e., driving) the at least one drive wheel 64 to rotate in either the first rotational direction R1 or the second rotational direction R2. Notably, the receipt of either the neutral signal or the non-engaged signal (or corresponding lack of signal), or the receipt of both the neutral signal and the non-engaged signal (or lack of both signals), by the controller 126 prompts the generation of the associated command by the controller 126. As such, without powered driving assistance, the driving assist device 254, especially when it's in the form of a handle, simply acts as an additional manual operator interface to manually propel the patient transport apparatus 20 in a corresponding direction along the floor surface 99.

As shown in FIG. 4A, the linear direction arrow D1 refers to a direction of travel of the patient transport apparatus 20 in a forward direction along the floor surface 99 and generally along the longitudinal axis 28, while the corresponding linear direction arrow D2 refers to a direction of travel of the patient transport apparatus 20 along the floor surface 99 in a rearward direction along the longitudinal axis 28 opposite the forward direction D1.

The linear direction arrow D3 refers to a direction of travel of the patient transport apparatus 20 along the floor surface 99 in a leftward lateral direction normal to the longitudinal axis 28 and linear directions D1 and D2, while the corresponding linear direction arrow D4 refers to a direction of travel of the patient transport apparatus 20 along the floor surface 99 in a rightward lateral direction normal to the longitudinal axis 28 opposite the leftward lateral direction D3.

The linear direction arrows D5-D8 refer to directions of travel of the patient transport apparatus 20 along the floor surface 99 that are not coincident with any of the respective linear directions D1-D4. More specifically, the linear directions D5-D8 are angled with respect to the longitudinal axis 28 (and also angled with respect to the lateral direction normal to the longitudinal direction) and a respective one of the forward linear direction D1 or rearward linear direction D2 at an angle being between 0 and 90 degrees. Accordingly, the directions D5-D8 are meant to refer to and include each of the infinite number of possible angles that are not defined by the respective linear directions D1-D4. For example, the direction arrow D5 includes all possible angles between D1 and D3.

The clockwise rotational direction DR1 and counterclockwise rotational direction DR2 refers to a direction of travel of the patient transport apparatus 20 along the floor surface 99 in which the patient transport apparatus 20 rotates generally in a clockwise manner or counterclockwise manner about a vertically extending axis of the patient transport apparatus 20.

For ease of description, the linear directions D1-D8 and rotational directions DR1 and DR2 will be utilized in conjunction with the description of the operation of the various embodiments of the user input controls 250 as described in FIGS. 5A-10B below. It should be appreciated, of course, that other types of movements are possible, such as shown in FIG. 4, but the movements D1-D8 are shown for simplicity and convenience.

In FIG. 4B, the mode switch 252 has been moved to select the longitudinal transport mode (shown as "First Mode On"

in FIG. 4B) and the driving assist device 254 has been moved to an engaged state (shown as "Driving Assist Engaged" in FIG. 4B). Accordingly, a first signal is generated by the mode switch 252 corresponding to the selected longitudinal transport mode, and an engaged signal is generated by the driving assist device 254 corresponding to the driving assist device being in the engaged state, with these signals sent to the controller 126. The controller 126 receives the first signal and the engaged signal and generates one or more corresponding first output signals (first commands). One command may be received by the lift actuator 66 to place or confirm the placement of the at least one drive wheel 64 in the deployed position (e.g., to move the at least one drive wheel 64 to the deployed position). In addition, another command is received by the swivel actuator 71 to place or confirm the placement of the at least one drive wheel 64 in the non-swiveled position. A command from the controller 126 is also received by the powered drive system 90, which directs the motor 102 to engage (i.e., drive) the at least one drive wheel 64 in either a first rotational direction R1 or second rotational direction R2 to aid the user in propelling the patient transport apparatus 20 in either the forward direction D1 or rearward direction D2.

In FIG. 4C, the mode switch 252 has been moved to select the multidirectional mode (shown as "Second Mode On" in FIG. 4C) and the driving assist device 254 has been placed in an engaged state by the user (shown as "Driving Assist Engaged" in FIG. 4C). Accordingly, a second signal is generated by the mode switch 252 corresponding to the selected multidirectional mode and an engaged signal is generated by the driving assist device 254 corresponding to the engaged state. The controller 126 receives the second signal and the engaged signal and generates one or more corresponding second output signals (second commands). One command may be received by the lift actuator 66 to place or confirm the placement of the at least one drive wheel 64 in the deployed position (e.g., to move the at least one drive wheel 64 to the deployed position). In addition, another command is also received by the swivel actuator 71 which places or confirms the placement of the at least one drive wheel 64 in either the non-swiveled position or a swiveled position, depending on the desired direction of movement indicated by the user's actuation of the driving assist device 254. A command from the controller 126 is also received by the powered drive system 90, which directs the motor 102 to engage (i.e., drive) a corresponding respective one of the at least one drive wheels 64 in either a first rotational direction R1 or second rotational direction R2, with each respective drive wheel 64 rotating at a determined rotational speed to aid the user in propelling the patient transport apparatus 20 in the desired linear direction (e.g., D1, D2, D3, D4, D5, D6, D7 or D8) and/or in the desired rotational direction (e.g., DR1 or DR2). The drive wheels 64 may be driven independently, together, at the same speed, different speeds, in the same rotational direction, and/or in different rotational directions.

As previously described, the sensing system S may be employed to determine a current position of the at least one drive wheel 64 (e.g., deployed/retracted or current orientation about the swivel axis 81) with this feedback being provided to the controller 126 to place the at least one drive wheel 64 in the desired position corresponding to the longitudinal transport mode or the multidirectional mode.

When using a version having two drive wheels 64 as shown in FIGS. 3A and 3B, or in alternative configurations (not shown) having two drive wheels deployed along the patient transport apparatus 20 in different locations (such as, for instance, along or outward from the perimeter of the base 24) if a user wants to turn a corner while driving (either reverse or forward) in the longitudinal transport mode, the user could indicate this intent through the driving assist device 254 as described in the various embodiments outlined below, and the controller 126 could respond by slowing one of the motors 102 relative to the other (e.g., when both drive wheels 64 are rotating in the same longitudinal direction), which would cause a turning of the patient transport apparatus 20, with the direction of turning corresponding to which drive wheel 64 is slowed relative to the other. The degree of rotation or force applied to a handle or other driving assist device 254 could be proportional to the percentage of slowdown of the one drive wheel 64. Other ways of controlling the drive wheels 64 to cause such turning are also contemplated. Suitable arrangements and control of two or more drive wheels, are shown in U.S. Patent Publication No. 2018/0250178, Mar. 2, 2018, and entitled, "Systems And Methods For Facilitating Movement Of A Patient Transport Apparatus," the entire contents of which are hereby incorporated herein by reference.

The user input control 250, and more specifically the mode switch 252 and driving assist device 254, may be provided in many different forms to assist a user in the movement of the patient transport apparatus 20 as described generally in FIGS. 4A-4C above. For example, the mode switch 252 may be embodied on a touch screen interface, as one or more buttons, one or more dials, one or more switches, one or more sensors, or any other suitable user input device in which selection among two or more modes is possible. Additionally, the mode switch 252 may be embodied within the controller 126 (e.g., in hardware and/or software), and/or may be automatically operated based on certain circumstances and situations, such as those outlined herein. The driving assist device 254 may be in the form of handles, dials, joysticks, sensors, or any other suitable user input device in which the user can input intended movement. Non-limiting examples of such user input devices 250, as well as descriptions of the operation of such user input devices 250, are described below in FIGS. 5-10.

Figure 5A:
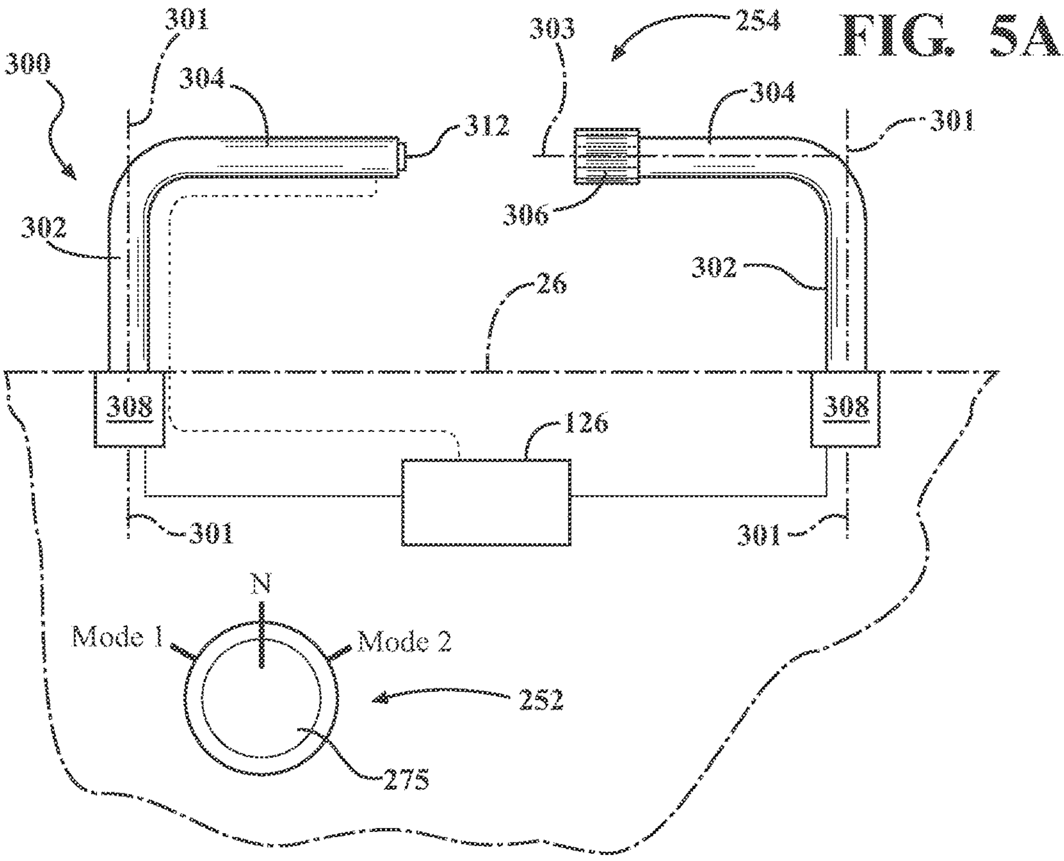
FIG. 5A is a perspective view of a user input control and controller according to one embodiment.

Referring first to FIGS. 5A-5D, the driving assist device 254 according to one exemplary embodiment includes a pair of handle members 300 each independently coupled to and extending from the patient support structure 22 (shown in FIG. 5A as coupled to the intermediate frame 26) and the mode switch 252 comprises a rotatable dial 275 coupled to patient support structure 22. In some embodiments, the mode switch 252 could be coupled to the intermediate frame 26 between the pair of handle members 300. While the rotatable dial 275 is shown as a generally round dial in FIGS. 5A-5D, the shape of the dial 275 could take on a wide variety of other shapes and perform in the same manner as described. For example, the rotatable dial 275 may be bell-shaped, stalk-shaped, doorknob shaped, or any other shape that allows rotation. The rotatable dial 275 has three positions, including a neutral dial position ("N"), a longitudinal transport mode dial position ("Mode 1"), and a multidirectional mode dial position ("Mode 2"). While the rotatable dial 275 is illustrated in FIG. 5A, any other type of device that could perform the same or similar function is contemplated. For example, a toggle switch, a lever, or a series of push buttons or the like having at least two operating positions (corresponding to the longitudinal transport mode dial position ("Mode 1") and the multidirectional mode dial position ("Mode 2")) are also contemplated. Such a toggle switch could be incorporated into the graspable handles 304 in some embodiments. In some versions, the mode switch 252 comprises an electronic control carried out by the controller 126 in response to one or more predetermined events or criteria, as described below.

Each handle member 300 comprises a post member 302 defining a length between a first end and a second end. The handle member 300 also has a graspable handle 304 coupled to the first end and extending transverse to the post member 302. A post axis 301 is also defined along the length of the post member 302.

The driving assist device 254 further comprise an engageable throttle control 306, such as an analog or digital throttle control 306, coupled to a portion of the graspable handle 304. The throttle control 306 is coupled to the controller 126 and the controller 126 is configured to command the powered drive system 90 via the motor 102 to engage the at least one drive wheel 64 to assist in propelling the patient transport apparatus 20 along the floor surface 99 based on input from the throttle control 306. The throttle control 306 can be in many forms and may be hand actuated, finger actuated, thumb actuated, gesture controlled, or the like. For example, the throttle control 306 in FIGS. 5A-5D is in the form of a rotatable throttle that rotates in a first (forward) or second (reverse) rotational direction about graspable handle axis 303 for forward and rearward speed control. The extent of rotation of the rotatable throttle 306 correlates to the speed of the at least one drive wheel 64, e.g., the more the rotatable throttle 306 is rotated forward the faster the drive wheel 64 rotates in a forward direction and the more the rotatable throttle 306 is rotated rearward the faster the drive wheel 64 rotates in a rearward direction. A spring may bias the rotatable throttle 306 to a neutral position. An example of such a throttle control 306 is described in U.S. patent application Ser. No. 16/222,510, filed on Dec. 17, 2018, and entitled "Patient Transport Apparatus With Controlled Auxiliary Wheel Speed," the entire disclosure of which is hereby incorporated herein by reference. In another alternative, a portion of the graspable handle 304 itself could be rotatable and thus define the rotatable throttle control 306. The throttle control 306 could also be in the form of one or more push buttons (e.g., one for forward movement and one for rearward movement) that require constant actuation to cause powered driving assist, i.e., when released, the motors 102 are stopped. In some versions, a single press of the one or more push buttons may be suitable to cause continuous movement until stopped (such as by a separate neutral button).

Figure 5B:
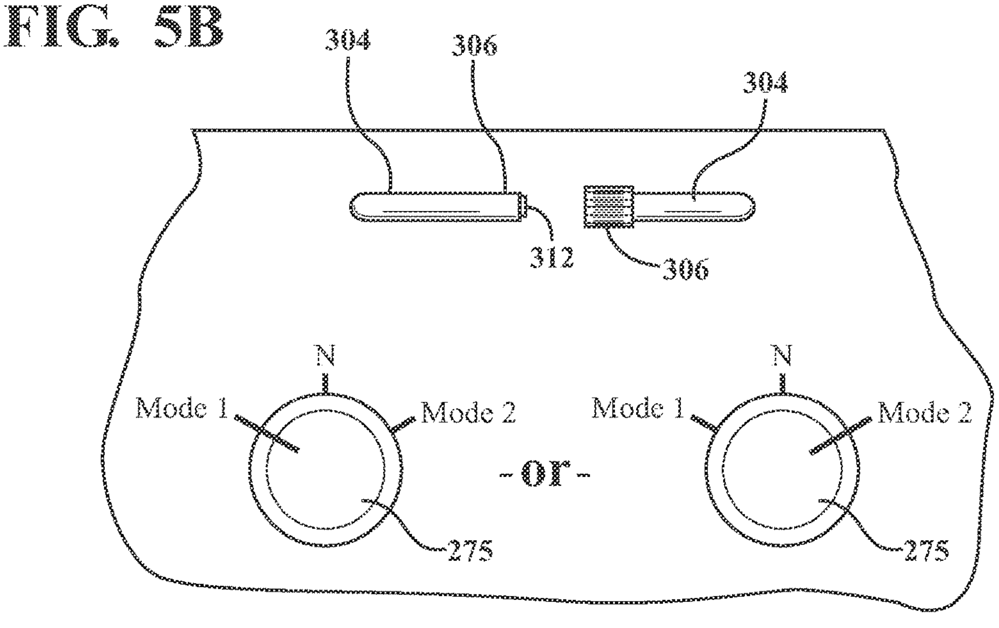
FIG. 5B is a top view of the pair of handle members of FIG. 5A in a central position.
Figure 5C:
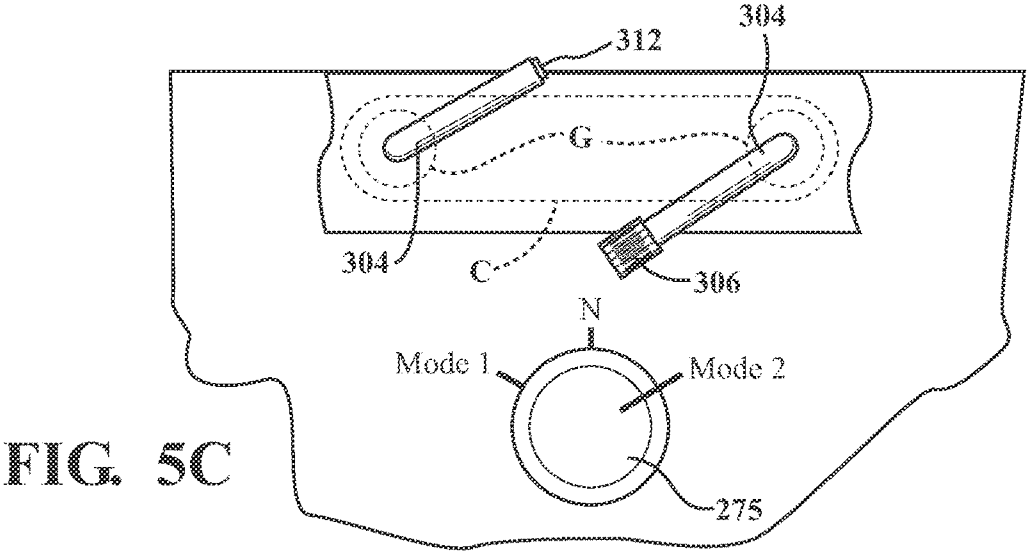
FIG. 5C is a top view of the pair of handle members of FIG. 5A in a coordinated counterclockwise rotated position.
Figure 5D:
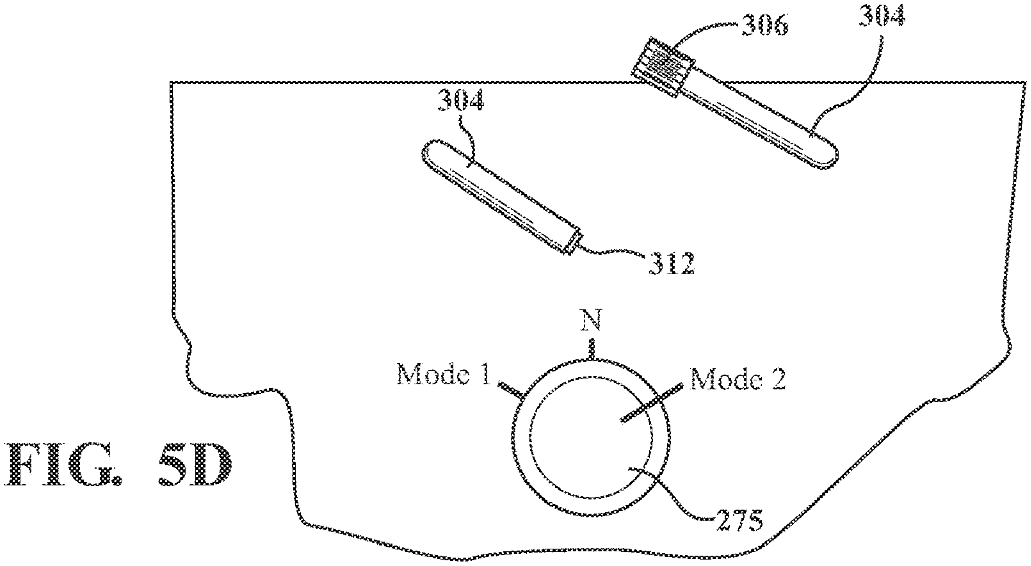
FIG. 5D is a top view of the pair of handle members of FIG. 5A in a coordinated clockwise rotated position.

Each of the graspable handles 304 of the pair of handle members 300 are rotatable in a coordinated manner (e.g., simultaneously by the user) in a clockwise or counterclockwise direction about their respective post axis 301 between a coordinated central position or neutral position (as shown in FIGS. 5A and 5B) and a coordinated first position (shown as a coordinated counterclockwise position in FIG. 5C and a coordinated clockwise position in FIG. 5D). It should be appreciated that the arrangement, positioning, and/or movement of the graspable handles 304 among the various positions shown is merely exemplary. Other arrangements, positions, and movements of the graspable handles 304 are contemplated. Rotation of the handle members 300 may be coordinated by virtue of some form of linkage between the handle members 300, such as meshed gears, or the like (see gears G/chain C shown in phantom lines in FIG. 5C). In the coordinated first position, for example, the pair of handle members 300 are rotated from greater than 0 to 90 degrees around their respective post axis 301 in either the clockwise or counterclockwise direction. A potentiometer 308 is coupled to the second end of the post member 302 of each of the handle members 300 to measure an angle of rotation of the handle members 300. The potentiometer 308 generates the engaged signal sent to the coupled controller 126 corresponding to the respective coordinated positioning of the handle members 300 according to the amount of rotation from greater than 0 to 90 degrees.

One of the graspable handles 304 can also include an engageable control device 312, shown as a push button 312, that is depressed in order to allow the rotational movement in the clockwise or counterclockwise direction of the graspable handles 304 about the post axis 301 from the coordinated first position to the coordinated central position, or vice versa. The push button 312 may be connected to a linkage that either allows/restricts rotation of the handle members 300. In the absence of engagement of the engageable control device 312, the pair of handle members 300 remain fixed in the coordinated central position or any other suitable, neutral position. When the user wishes to steer/turn the patient transport apparatus 20 in the longitudinal transport mode, or wishes to reorient the at least one drive wheel 64 in the multidirectional mode, the user depresses the push button 312 to allow rotational movement of the graspable handles 304 to cause such movement, as described further below.

In operation, for example, when the user wishes for powered driving assistance to move the patient transport apparatus 20 in the forward linear direction D1 or rearward linear direction D2 (see directional notations in FIG. 4B), the user rotates the rotatable dial 275 to the longitudinal transport mode dial position ("Mode 1") as shown in FIG. 5B. The positioning of the rotatable dial 275 in the longitudinal transport mode dial position ("Mode 1") generates the first signal that is sent to the controller 126. The user then engages the throttle control 306 to generate the engaged signal that is sent to the controller 126 (otherwise, the throttle control 306 indicates a non-engaged state). The controller 126 receives the first signal and the engaged signal and responds with one or more first commands to the lift actuator 66, the swivel actuator 71, and/or the powered drive system 90 as described above. In certain embodiments, the partial or full rotation of the throttle control 306 may result in the generation of different engaged signals that allows for the powered drive system 90 to command the motor 102 at a corresponding speed to aid the user in propelling the patient transport apparatus 20 at rotational speeds up to the maximum allowable speed in the selected mode.

Figure 5E:
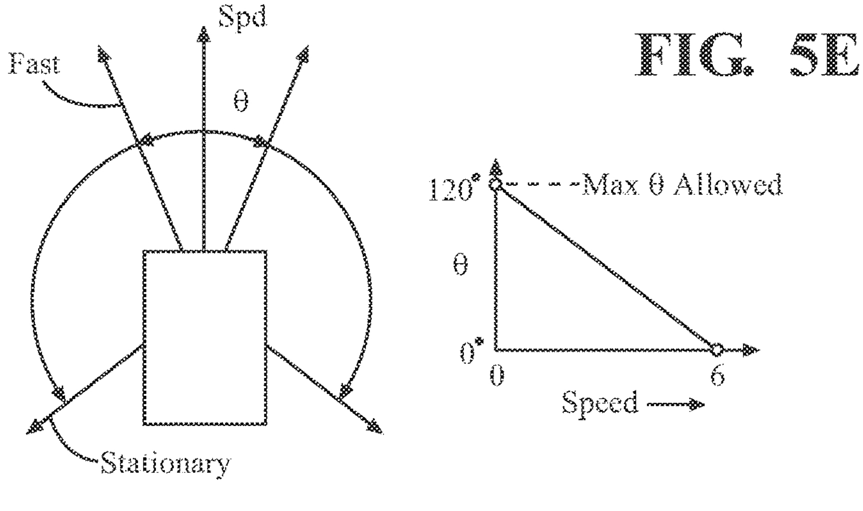
FIG. 5E illustrates a graph of allowed turn angles with respect to speed.

In the longitudinal transport mode, when the user wishes to steer/turn the patient transport apparatus 20, such as around a corner, the user first actuates the control device 312 to allow such rotation of the graspable handles 304, which are then turned by the user in the desired direction and at the desired amount to cause sufficient steering/turning. In response, such as when using two drive wheels 64, the controller 126 slows one of the motors 102 relative to the other, which causes the desired steering/turning of the patient transport apparatus 20, with the direction of turning corresponding to which drive wheel 64 is slowed relative to the other. In some embodiments, the controller 126 may dictate the maximum turn angle allowed to be made by the powered drive system 90, regardless of the rotational position of the graspable handles 304. For example, if the patient transport apparatus 20 is moving at its maximum speed down a long hallway, such as at 6 mph, even if the user suddenly rotates the graspable handles 304 to 90 degrees for a sharp left turn, the power drive system 90 will not respond accordingly, but instead only allow a smaller turn (e.g., 20, 10, or 5 degrees) until the speed of the patient transport apparatus 20 is below a certain threshold (which could be measured by a potentiometer, hall-effect sensor at the motor 102, accelerometer, or other speed sensor). A relationship between allowed steering/turn angle and speed is represented in FIG. 5E. As shown, the faster the patient transport apparatus 20 is moving in the longitudinal transport mode, the less turn angle θ is allowed. As the speed approaches zero (e.g., see "stationary"), the greater the allowed turn angle θ, which could be a maximum turn angle of 120 degrees (right or left). A control algorithm stored in memory and executed by the microprocessors of the controller 126 may be utilized to determine and control the amount of turning allowed based on the speed according to the graph of FIG. 5E.

When the user desires the patient transport apparatus 20 to be moved in one of linear directions D3-D8, for example, the user rotates the rotatable dial 275 to the multidirectional mode ("Mode 2"). The positioning of the rotatable dial 275 in the multidirectional mode dial position ("Mode 2") generates the second signal that is sent to the controller 126. The user also positions the handle members 300 by rotating the handle members in either a clockwise or counterclockwise direction from greater than 0 to 90 degrees about the post axis 301 such that the graspable handles 304 are in a coordinated first position. The potentiometer 308 generates a corresponding position signal that is sent to the controller 126 indicating that the graspable handles 304 are in the coordinated first position and identifying the relative degree of rotation from greater than 0 to 90 degrees. The user then engages the throttle control 306 to generate the engaged signal that is sent to the controller 126. The controller 126 receives the generated second signal and the engaged signal and generates the one or more second commands as described above. For instance, the controller 126 may command the swivel actuator 71 to first reorient the drive wheels 64 to a swiveled position that coincides with the desired direction D3-D8 and actuation of the throttle control 306 may cause the powered drive system 90 to drive the drive wheels 64 at a corresponding speed to aid the user in propelling the patient transport apparatus 20 at rotational speeds up to the maximum allowable speed in the selected mode. By way of example, when the handle members 300 are in the counterclockwise first position as in FIG. 5C with the angle of rotation at 45 degrees from the coordinated central position, and when the throttle control 306 is engaged, the patient transport apparatus 20 is propelled in the linear direction D5 (see directional notations in FIG. 4C). Alternatively, if the rotational angle was 90 degrees, power assistance would aid in propelling the patient transport apparatus 20 in the linear direction D3, corresponding to the left lateral direction.

In certain embodiments, as the relative rotation of the handle members 300 increases as sensed by the potentiometer 308, the maximum allowable rotational speed of the at least one drive wheel 64 that aids in propelling the patient transport apparatus 20 may be decreased (or increased in some cases). Thus, for example, when the handle members 300 are in the counterclockwise first position as in FIG. 5C with the angle of rotation at 45 degrees, the relative amount of power assist provided by the powered drive system 90 in commanding the motor 102 to aid in rotating the at least one wheel 64 in the first rotational direction R1, as determined by the controller 126 through the output signal from the potentiometer 308, may be 50% or some other factor less than the power assist provided by the powered drive system 90 in commanding the motor 102 to aid in rotating the at least one wheel 64 in the first rotational direction R1 when the handle members 300 are in the coordinated central position as in FIG. 5B. A different power assist factor may be provided when the handle members 300 are rotated to a coordinated counterclockwise position of 15 degrees, or 30 degrees, or 75 degrees. In each of these instances, a control algorithm stored in memory and executed by the microprocessors of the controller 126 may be utilized to determine the amount of power assist of the motor 102 of the powered drive system 90 at each of the positions of the graspable handles 304.

In further embodiments not shown, the angle of rotation of the handle members 300 may not be in a 1:1 ratio with the turn angle provided in the longitudinal transport mode and/or the angle of rotation of the handle members 300 may not be in a 1:1 ratio with the amount that the at least one drive wheel 64 is reoriented in the multidirectional mode. For instance, in the embodiment described above, in the longitudinal transport mode, when the handle members 300 are rotated 90 degrees, the patient transport apparatus 20 turns 90 degrees, and, in the multidirectional mode, when the handle members 300 are turned 90 degrees, the at least one drive wheel 64 is swiveled 90 degrees to drive the patient transport apparatus 20 in a lateral direction. However, the ratio of angle of rotation of the handle members 300 to turn angle/swivel angle may be less than 1:1, or greater than 1:1. Accordingly, less, or more, rotation of the handle members 300 could be required to achieve the desired turning or swiveling of the at least one drive wheel 64.

In versions where the mode switch 252 is embodied in software run by the controller 126, switching between the longitudinal transport mode and the multidirectional mode may be carried out by the controller 126 automatically based on speed of the patient transport apparatus 20 (e.g., speed of the motors 102, absolute speed of the patient transport apparatus 20, etc., as determined by a sensor coupled to the controller 126). In other words, when the throttle control 306 is engaged, and the speed is above a certain threshold, the patient transport apparatus 20 is in the longitudinal transport mode and when the speed is below the threshold, the patient transport apparatus 20 is in the multidirectional mode. The speed threshold may be 0.5 mph, 1.0 mph, 1.5 mph, 2.0 mph, 2.5 mph, or the like. For instance, when the speed is above the threshold, e.g., above 1.5 mph, the longitudinal transport mode is active so that when the user rotates the handle members 300, the rotation results in steering/turning of the patient transport apparatus 20, such as by slowing one of the motors 102 relative to the other (e.g., when both drive wheels 64 are rotating in the same longitudinal direction). Conversely, when the speed is below the threshold, e.g., below 1.5 mph, the multidirectional mode is active so that when the user rotates the handle members 300, the swivel actuator 71 reorients the drive wheels 64 to a swiveled position that coincides with the desired direction of movement. In some cases, the patient transport apparatus 20 may only be able to reach speeds above the threshold when the at least one drive wheel 64 is in the non-swiveled position. Accordingly, in some cases, if the at least one drive wheel 64 is in any of the swiveled positions, then it will only be capable of operation in the multidirectional mode until the at least one drive wheel 64 is moved to the non-swiveled position, which could be accomplished by rotating the handle members 300 back to their neutral position.

Figure 6A:
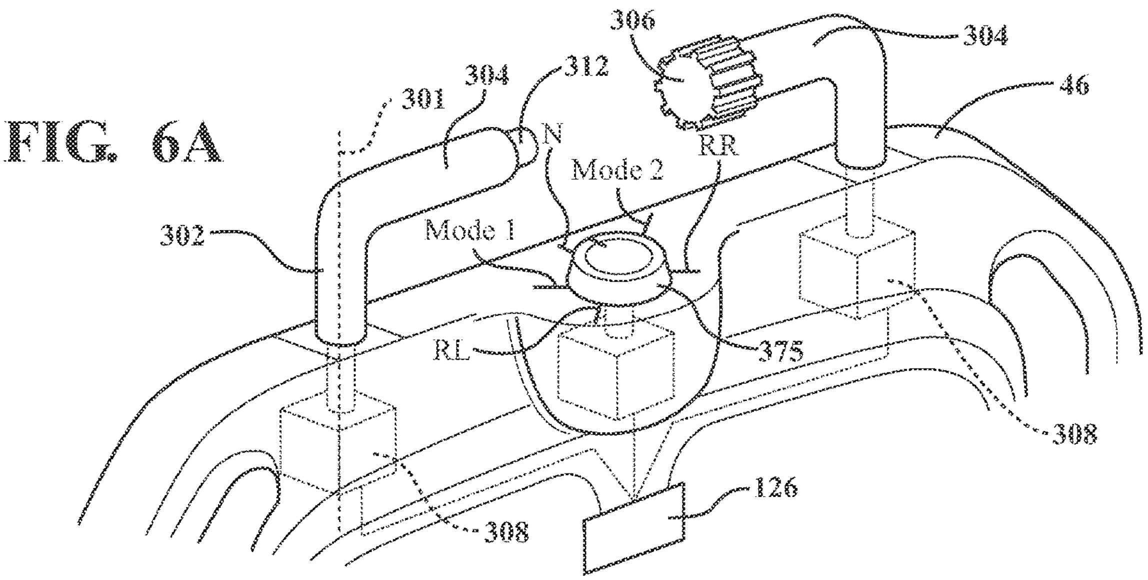
FIG. 6A is a perspective view of a user input control and controller according to another embodiment including a pair of handle members and a rotatable dial in a neutral position.
Figure 6B:
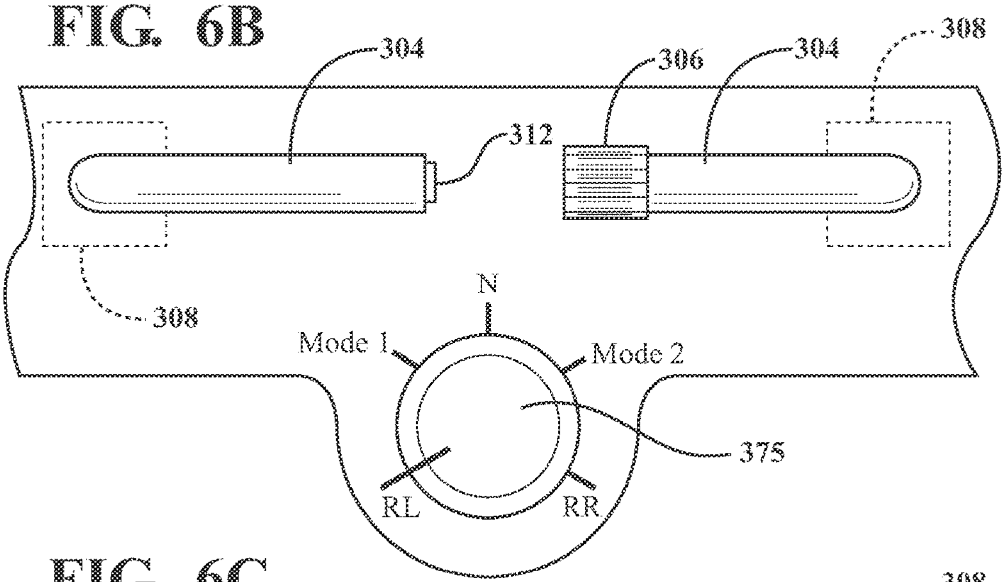
FIG. 6B is a top view of a portion of FIG. 6A with the rotatable dial in a rotational left position.
Figure 6C:
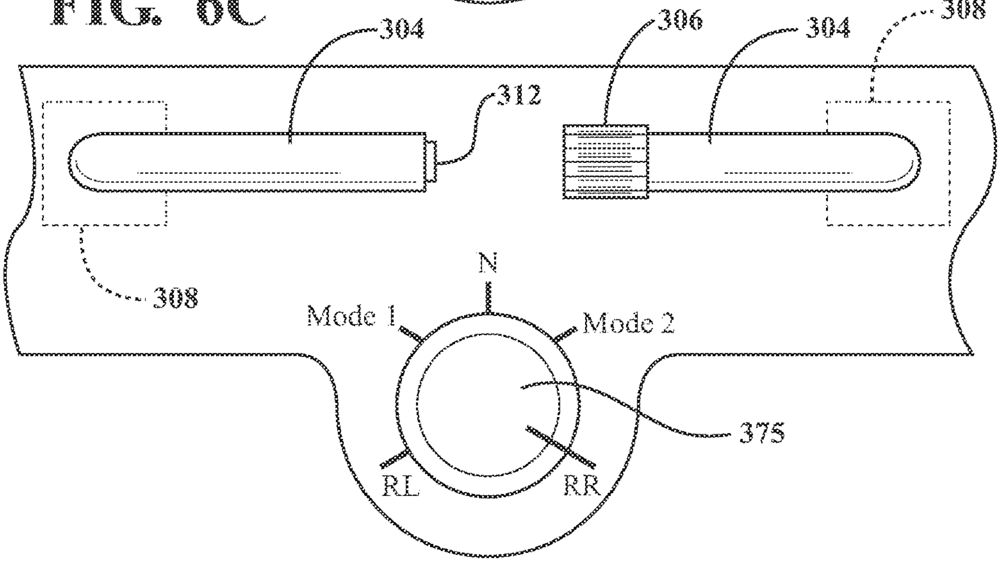
FIG. 6C is a top view of a portion of FIG. 6A with the rotatable dial in a rotational right position.

In a further related embodiment, as shown in FIGS. 6A-6C, the rotatable dial 275 of FIGS. 5A-5D includes two additional dial positions, namely a counterclockwise rotation dial position ("RL"), and a clockwise rotation dial position ("RR"), and is hereinafter referred to as rotatable dial 375. In this embodiment, the patient transport apparatus 20 includes two or more drive wheels 64, such as the pair of drive wheels 64 as depicted in FIGS. 3A and 3B above. While the rotatable dial 375 is shown as a generally round dial in FIGS. 6A-6C, the shape of the dial 375 could take on a wide variety of other shapes and perform in the same manner as described. For example, the rotatable dial 375 may be bell-shaped, stalk-shaped doorknob shaped, or any other shape.

When the rotatable dial 375 is rotated to the clockwise rotation dial position RR (as shown in FIG. 6C) or to the counterclockwise rotation dial position RL (as shown in FIG. 6B), the rotatable dial 375 generates the second signal which is sent to the controller 126 to indicate that the patient transport apparatus 20 is in a specific implementation of the multidirectional mode (these could also be separate modes in other embodiments). When the user engages the throttle control 306, an engaged signal is also sent to the controller 126, which in turn generates the one or more second commands received by the lift actuator 66, the swivel actuator 71, and/or the powered drive system 90. In this case, the command sent to the powered drive system 90 from the controller 126 also instructs each respective motor 102 to drive each respective one of the pair of drive wheels 64 independently in a counter-rotating manner in either the first rotational direction R1 or second rotational direction R2 at a predetermined speed so as to aid in rotating the patient transport apparatus 20 in the desired clockwise or counter-clockwise direction DR1 or DR2 (see FIG. 4C). In certain embodiments, the rotational speed of one of the pair of drive wheels 64 is faster than the rotational speed of the other one of the pair of drive wheels 64 so as to enhance the rotational effect in the desired clockwise or counterclockwise direction DR1 or DR2.

Figure 7:
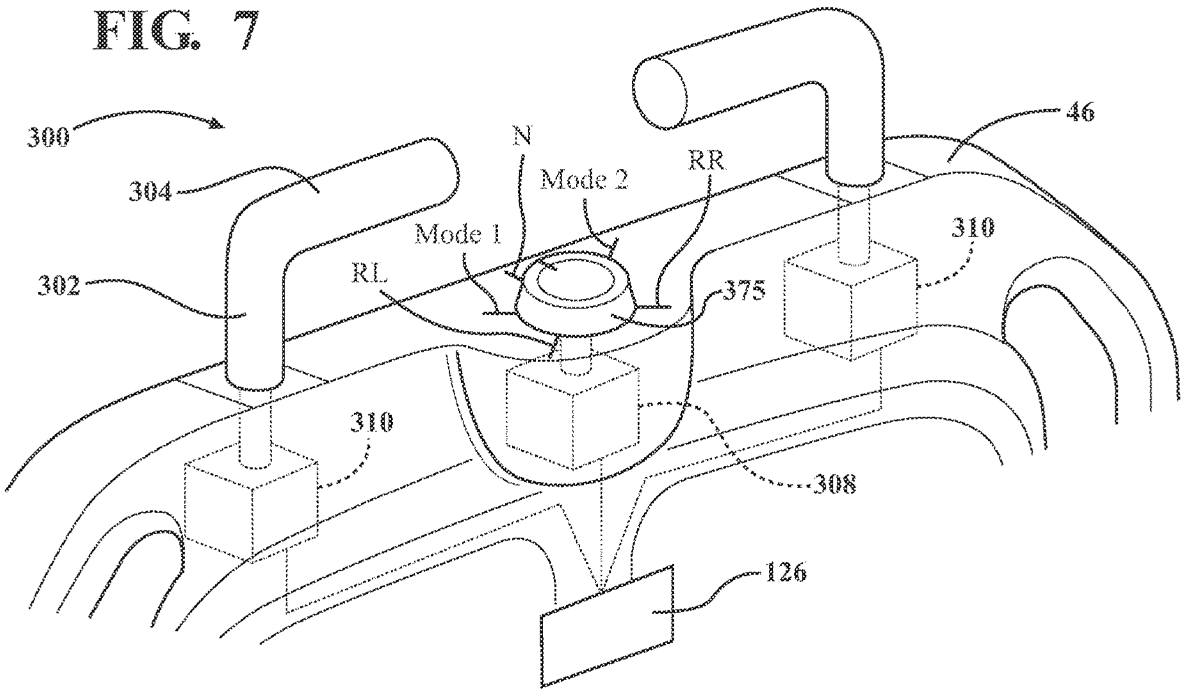
FIG. 7 is a perspective view of a user input control and controller according to another embodiment including a pair of handle members and a rotatable dial.

Referring now to FIG. 7, the driving assist device 254 according to another exemplary embodiment also includes the pair of handle members 300 each independently coupled to and extending from the patient support structure 22 and including the post member 302 and graspable handles 304. In addition, the mode switch 252 also includes the rotatable dial 375 as described above. In this embodiment, as opposed to the embodiment shown in FIGS. 5 and 6, the handle members 300 do not freely rotate. In this embodiment, a load cell 310 is coupled to the second end of one or both of the respective post members 302, with the load cells 310 also coupled to the controller 126.

When the user wishes for powered driving assistance to move the patient transport apparatus 20 in a forward linear direction D1 or rearward linear direction D2, for example, the user rotates the rotatable dial 375 to the longitudinal transport mode dial position (i.e., "Mode 1" as shown in FIG. 7) or to the multidirectional mode dial position (i.e., "Mode 2" as shown in FIG. 7), thereby generating the first signal or the second signal as described above with respect to the embodiments in FIGS. 5 and 6. Manual force is applied by the user to the pair of handle members 300 in a direction generally corresponding to the forward linear direction D1 or rearward linear direction D2, as detected by the load cell(s) 310, which in turn generates the engaged signal that is sent to the controller 126. Throttle control and the associated speed or acceleration of the motor 102 may be proportional to the force applied by the user. Any suitable relationship between the force and speed, acceleration, etc., can be used for throttle control. Alternatively, the force detected by the load cell(s) 310 may indicate direction of desired movement with a separate throttle control 306, as shown in FIGS. 5A and 6A, being used for speed control. Thus, in one case, the signal from the load cell(s) 310 constitutes the engaged signal. In other cases, the engaged signal comprises signals from the throttle control 306 and the load cell(s) 310. The load cell(s) 310 indicate a non-engaged state in the absence of applied forces or forces below a predetermined threshold.

When the user wishes for powered driving assistance to move the patient transport apparatus 20 in a transverse linear direction D3-D8, for example, the user rotates the dial 375 to the multidirectional mode dial position (i.e., "Mode 2" as illustrated in FIG. 7), which generates the second signal as described above. Manual force is applied by the user to the pair of handle members 300 in a direction of desired movement. The direction of force on the respective handle member(s) 300 detected by the load cell(s) 310 in turn corresponds to the detected direction that is determined by the controller 126 so that the controller 126 can command the swivel actuator 71 to turn the drive wheels 64 in the direction of desired movement. Throttle control and the associated speed or acceleration of the motor 102 may be proportional to the force applied by the user. Any suitable relationship between the force and speed, acceleration, etc., can be used for throttle control. Alternatively, the force detected by the load cell(s) 310 may indicate direction of desired movement with a separate throttle control 306, as shown in FIGS. 5A and 6A, being used for speed control. Thus, in one case, the signal from the load cell(s) 310 constitutes the engaged signal. In other cases, the engaged signal comprises signals from the throttle control 306 and the load cell(s) 310. The load cell(s) 310 indicate a non-engaged state in the absence of applied forces or forces below a predetermined threshold. A patient transport apparatus using load cells to detect a direction of desired movement, desired speed of movement, and corresponding powered driving assistance is described in U.S. Patent Application Publication No. 2016/0089283, filed on Dec. 10, 2015, entitled, "Patient Support Apparatus", the entire contents of which are hereby incorporated by reference.

When the rotatable dial 375 is rotated to the clockwise rotation dial position RR or to the counterclockwise rotation dial position RL, the rotatable dial 375 generates the second signal which is sent to the controller 126 to indicate that the patient transport apparatus 20 is in a specific implementation of the multidirectional mode, which operates in a similar manner as described above with respect to FIGS. 6A and 6B to rotate the patient transport apparatus 20 in the desired clockwise or counterclockwise direction DR1 or DR2.

Figure 8:
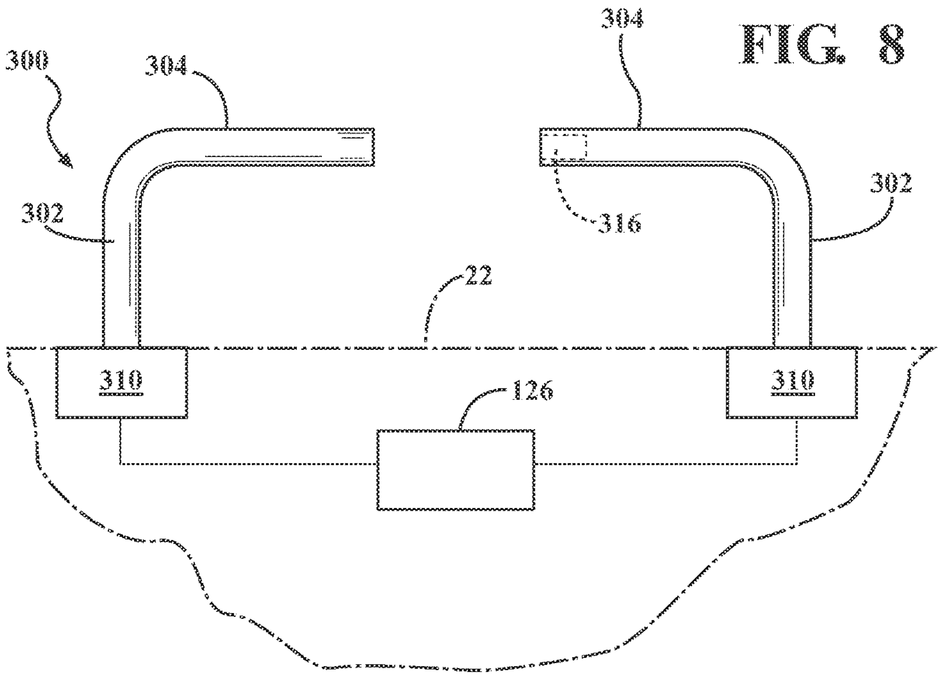
FIG. 8 is a perspective view of a user input control and controller according to another embodiment including a pair of handle members with a touch sensor.

Referring next to FIG. 8, a user input control according to another exemplary embodiment also includes a pair of handle members 300 each independently coupled to and extending from the patient support structure 22, that includes the post member 302, graspable handle 304, and the load cell 310 as described above. In this embodiment, as opposed to utilizing a rotatable dial 275 as the mode switch 252, a touch sensor 316 is coupled to one of the graspable handles 304 to act as the mode switch 252. The touch sensor 316 is also coupled to the controller 126. When the user wishes to operate in the longitudinal transport mode, the user contacts the touch sensor 316, which generates the first signal as described above. Conversely, when the user wishes to operate in the multidirectional mode, the user releases contact from the touch sensor 316 and then re-contacts the touch sensor 316, which generates the second signal as described above. To return to the longitudinal transport mode, the user again releases contact from the touch sensor 316, and then re-contacts the touch sensor 316, which generates the first signal as described above. Accordingly, each subsequent release and re-contact of the touch sensor 316 toggles from the longitudinal transport mode to the multidirectional mode, or from the multidirectional mode to the longitudinal transport mode.

Figure 9:
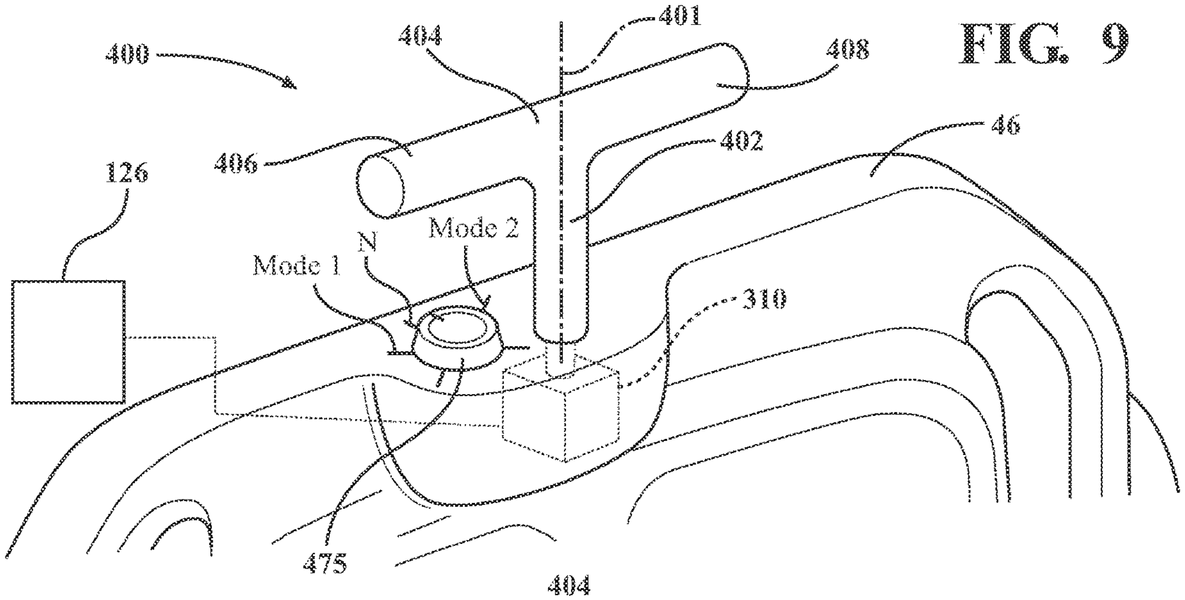
FIG. 9 is a perspective view of a user input control and controller according to another embodiment including a T-bar handle member and a rotatable dial

Referring now to FIG. 9, the driving assist device 254 according to another embodiment includes a T-Bar handle 400 having a first bar 402 coupled to the headboard 46 at a lower end and extending along its length in a vertical direction from said lower end to an upper end. The length of the first bar 402 also defines a steering axis 401. The T-bar handle 404 further includes a second bar 404 extending transverse to the first bar 402 between a first end 406 and a second end 408. In addition, the driving assist device comprises a load cell 310 coupled to the first bar 402 on the opposite end from the second bar 404, with the load cell 310 also coupled to the controller 126. In the embodiment illustrated, the T-Bar handle 400 is illustrated as being coupled to the headboard 46, but in alternative embodiments may be coupled to the footboard 48, support structure 22, one of the side rails 38, 40, 42, 44, or elsewhere.

As shown best in FIG. 9, the T-bar handle 400 is normally positioned in a central position in which the first bar 402 extends in a generally vertical direction with respect to the floor surface 99 and in which the length of the second bar 404 is generally perpendicular to the longitudinal axis 28 or longitudinal direction as described above.

Figure 9A:
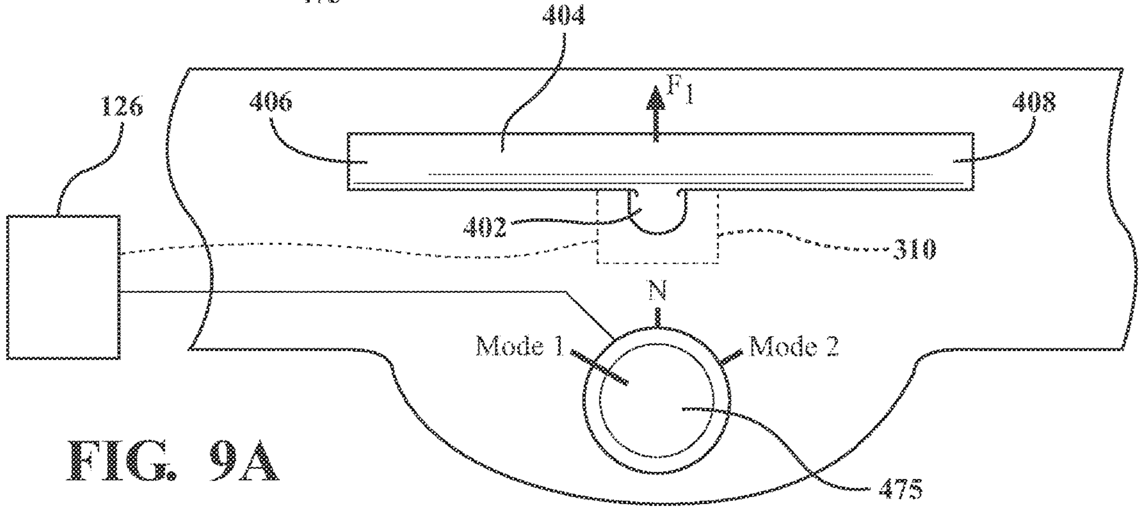
FIG. 9A is a top view of FIG. 9 with a manual force being applied to the T-bar handle member in a forward direction and the rotatable dial in Mode 1.

In addition, the mode switch 252 in this embodiment also includes a rotatable dial 475 that is positioned on the headboard 46. The rotatable dial 475 has three positions, including a neutral dial position ("N" as illustrated on FIG. 9A), a longitudinal transport mode dial position ("Mode 1" as illustrated in FIG. 9A), and a multidirectional mode dial position ("Mode 2" as illustrated in FIG. 9A). The rotatable dial 475 is the equivalent of the rotatable dial 275 described above with respect to FIGS. 5A-5D.

When the user desires to move the patient transport apparatus 20 in a forward linear direction D1 or rearward linear direction D2 (see FIG. 4B), the user moves the rotatable dial 475 to the longitudinal transport mode dial position ("Mode 1"), which generates the first signal that is sent to the controller 126. In addition, the user applies a forward force (shown as F1 in FIG. 9A) or a rearward force (shown as F2 in FIG. 9B) normal to the length of the second bar 404, causing the second bar 404 to be urged in a direction closer to footboard 48, or further from the footboard 48. The load cell 310 senses the forces F1 or F2 applied by the user on the T-bar handle 400 and sends the engaged signal to the controller 126 (the load cell 310 indicates a non-engaged state in the absence of applied forces or forces below a predetermined threshold). The controller 126 receives the first signal and the engaged signal and generates the one or more commands received by the lift actuator 66, the swivel actuator, and the powered drive system 90 as described above. Moreover, the user may steer/turn the patient transport apparatus 20 around a corner in the longitudinal transport mode as described above by applying a rotational torque to the T-bar handle 400 depending on the direction of the desired turn, which may cause differential speeds of the drive wheels 64 (e.g., when at least a pair of drive wheels 64 are used) to assist in the turn.

When the user desires to move the patient transport apparatus 20 in a lateral leftward linear direction D3 or lateral rightward linear direction D4, for example, the user rotates the rotatable dial 475 to the multidirectional mode dial position ("Mode 2"), which generates the second signal sent to the controller 126. In addition, the user applies a leftward force (shown as F3 in FIG. 9C) or a rightward force (shown as F4 in FIG. 9D) normal to the first end 406 or second end 408 of the second bar 404, causing the second bar 404 to be urged in a direction leftward or rightward. The load cell 310 senses the forces F3 or F4 applied by the user (e.g. force and/or torque) and sends the engaged signal to the controller 126.

The load cell 310 may be a six degree of freedom force/torque sensor capable of sensing forces along three axes and torques about three axes. Such a load cell 310 may interconnect the T-bar handle 400 to the headboard 46. As opposed to a load cell 310, other types of force and/or position sensing devices may be utilized, such as one or more displacement sensors, potentiometers (linear or rotational), hall-effect sensors, accelerometers, gyroscopes, load cells, pressure sensors, optical sensors, and the like. When using these position and/or force based sensors, the controller 126 determines a vector that establishes the direction of motion and the relative speed or acceleration of powered assistance may be based on the magnitude of force sensed or the magnitude of a component (e.g., x, y, z component) of the force that is sensed.

When the user wishes for powered drive assistance to move the patient transport apparatus 20 in a transverse linear direction D5-D8, the user rotates the rotatable dial 475 to the multidirectional mode dial position ("Mode 2"), which generates the second signal sent to the controller 126. The user then applies a rotational torque to the second bar 404 about the steering axis 401 in a counterclockwise manner as represented in FIG. 9F or in a clockwise manner as represented in FIG. 9G about the steering axis 401.

Figure 9B:
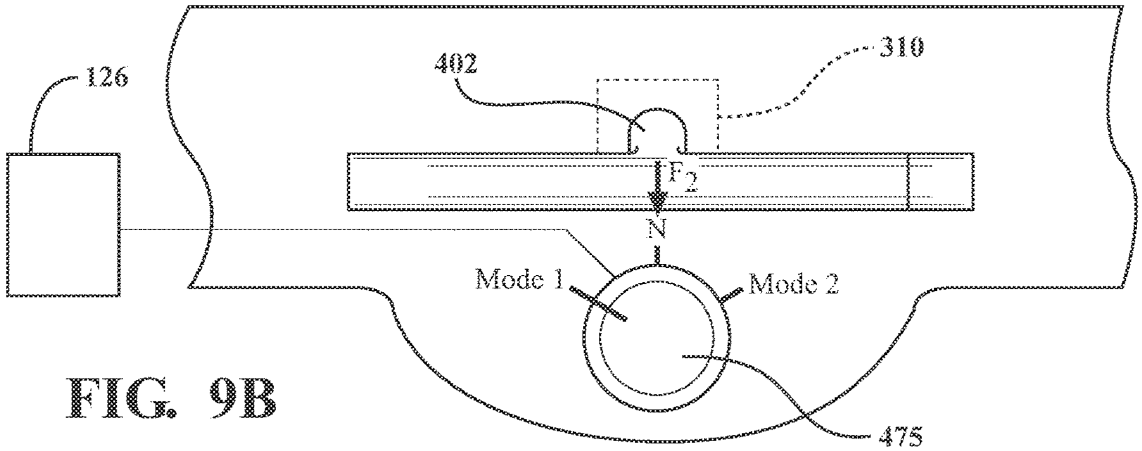
Figure 9C:
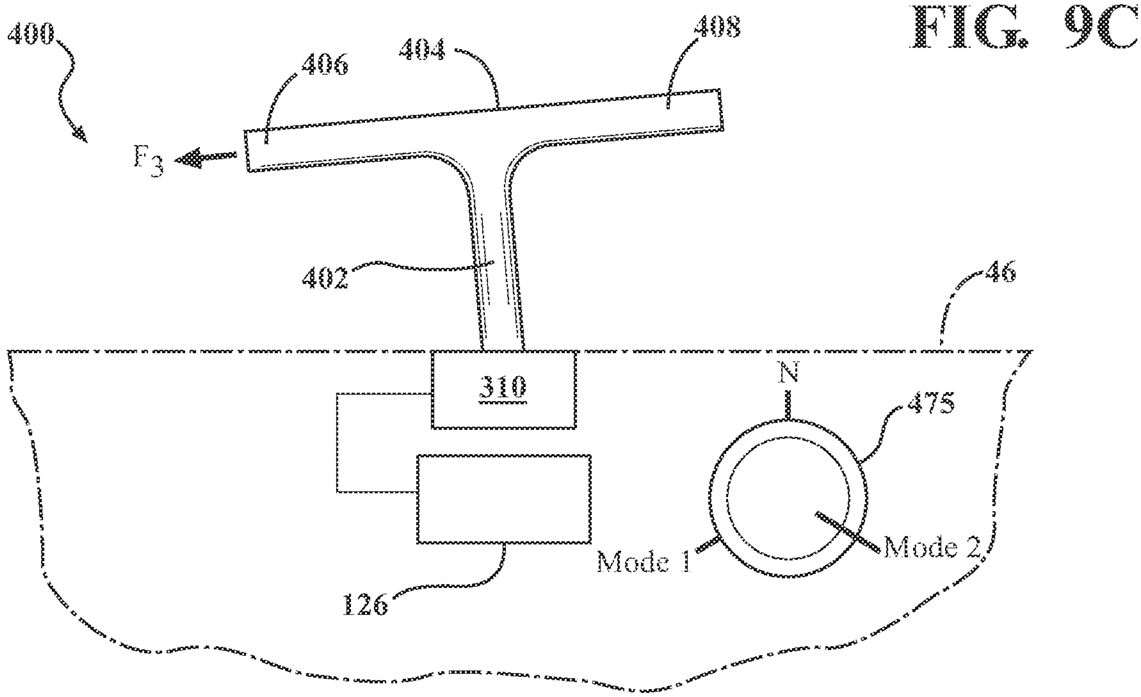
FIG. 9C is a perspective view of FIG. 9 with a manual force being applied to the T-bar handle member in a leftward direction and the rotatable dial in Mode 2.
Figure 9D:
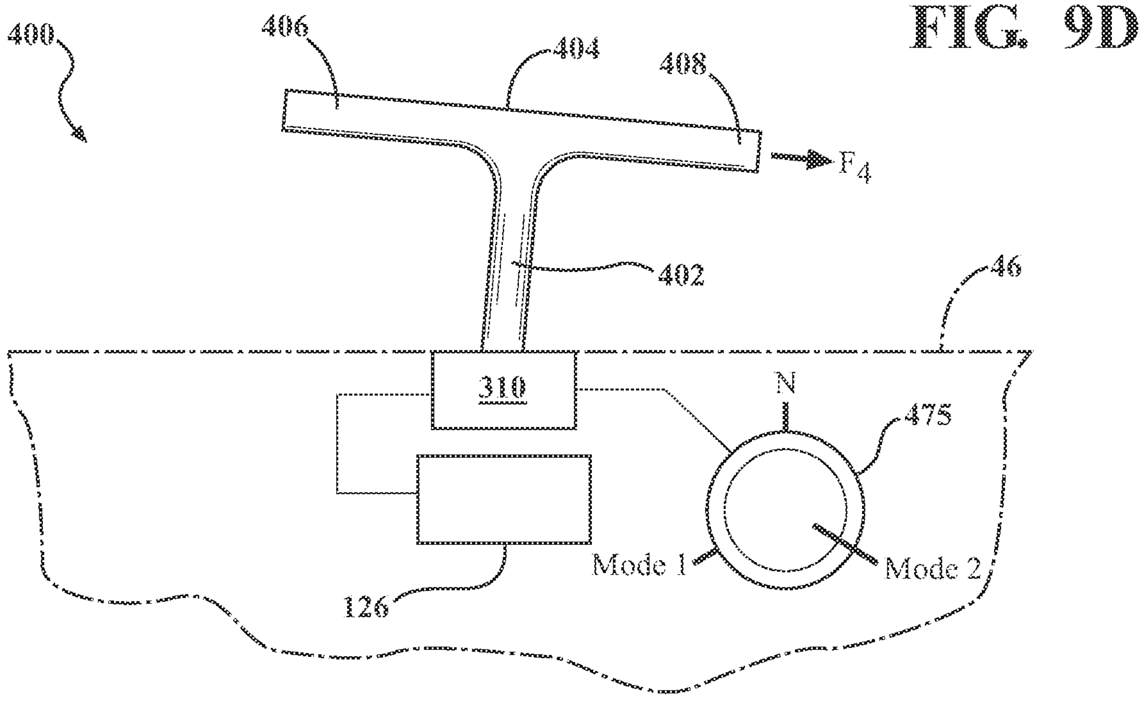
FIG. 9D is a perspective view of FIG. 9 with a manual force being applied to the T-bar handle member in a rightward direction and the rotatable dial in Mode 2.
Figure 9E:
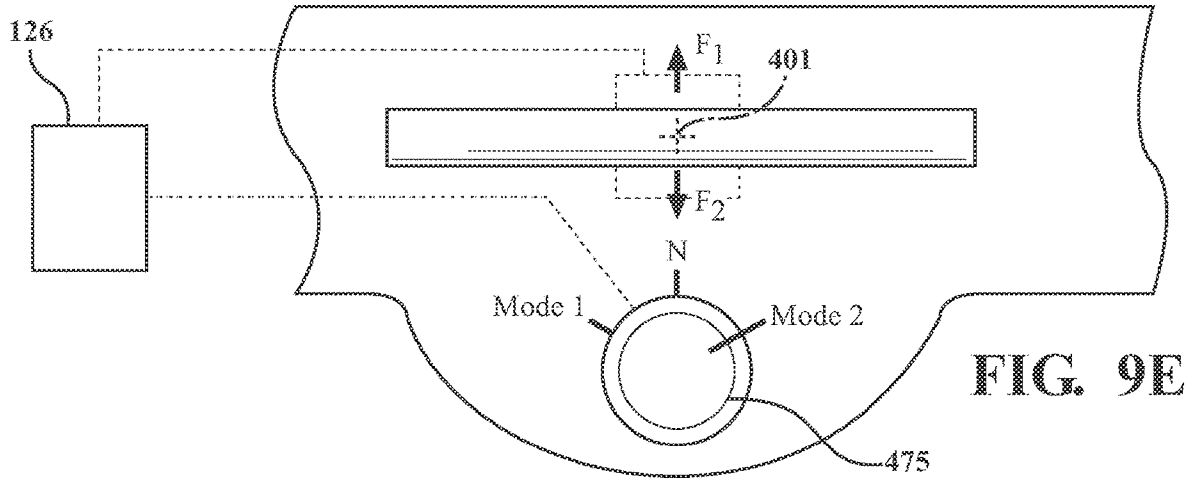
FIG. 9E is a top view of FIG. 9 with a manual force being applied to the T-bar handle member in a central direction and the rotatable dial in Mode 2.
Figure 9F:
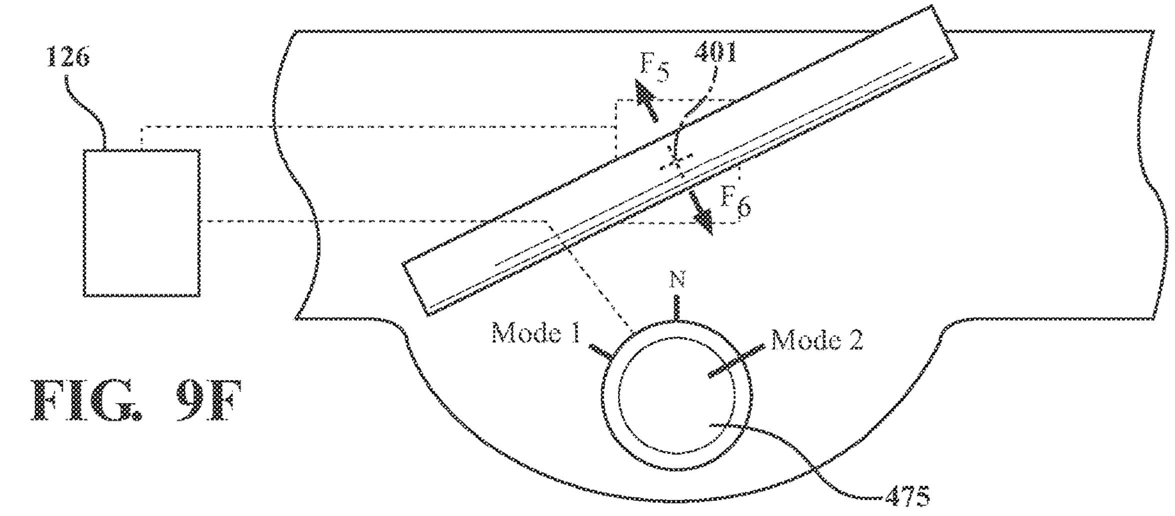
FIG. 9F is a top view of FIG. 9 with a manual force being applied to the T-bar handle member in a counterclockwise rotated direction and the rotatable dial in Mode 2.
Figure 9G:
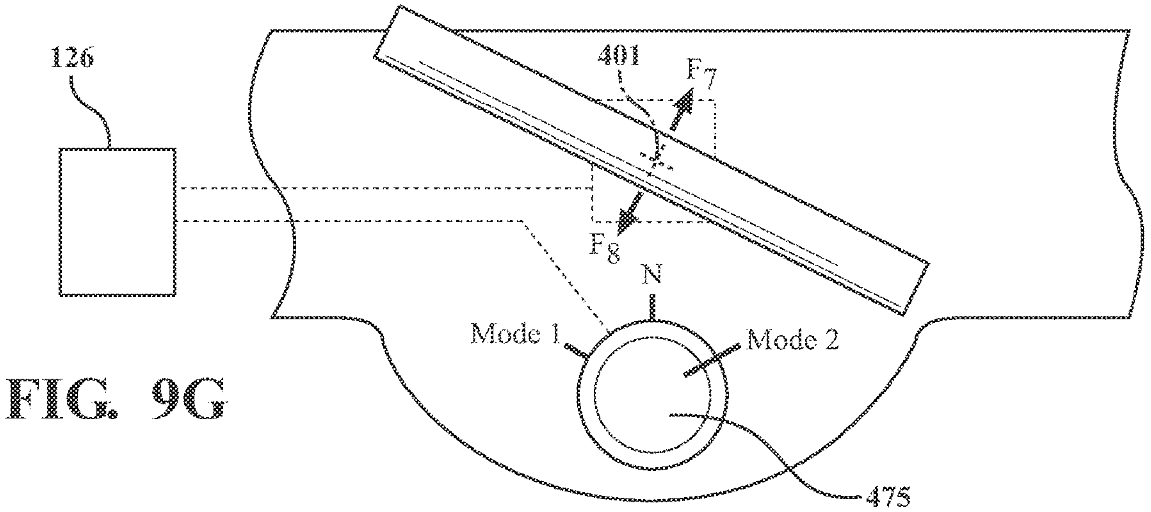
FIG. 9G is a top view of FIG. 9 with a manual force being applied to the T-bar handle member in a clockwise rotated direction and the rotatable dial in Mode 2.

The user simultaneously applies a force (i.e., a forward force F5 or rearward force F6 applied to the T-bar handle 400 shown in FIG. 9F or a forward force F7 or rearward force F8 applied to the T-bar handle 400 shown in FIG. 9G) to the second bar 404, thereby causing the T-bar handle 400 to be urged in a manner similar to how the T-bar 400 is urged as described above with respect to forward and rearward movement as shown in FIGS. 9A and 9B. In these positions, the load cell 310 further senses the rotational torque and the applied force and sends the engaged signal to the controller 126.

In further embodiments, a second T-Bar handle (not shown) may be coupled to one of the side rails 38, 40, 42, or 44, in addition to the T-Bar handle 400 that is coupled to the headboard 46 (or footboard 48). In this way, a user located along the side of the patient transport apparatus 20 may operate the second T-Bar handle in substantially the same manner as the first T-Bar handle 400 to facilitate movement of the patient transport apparatus 20.

Referring now to FIGS. 10A and 10B, in another embodiment, the driving assist device 254 may comprise a joystick 500 positioned on the support structure 22. The joystick 500 can be a stalk-type or ball-type joystick or any suitable form or joystick (shown as a stalk-type joystick in FIGS. 10A and 10B), and generally includes a post member 502, with a first end 504 of the joystick 500 coupled to the support structure 22 and a second end 506 extending away from the floor surface 99 relative to the first end 504. The length of the joystick 500 from the first end 504 to the second end defines a steering axis 501. The joystick 500 also has a load cell 310 that operates in the same manner as described above with respect to the T-bar handle 400 to sense forces and/or torques applied to the joystick 500. Alternatively, a position sensing system may be employed that comprises one or more sensors to detect a position of the joystick 500, such as one or more potentiometers, hall-effect sensors, accelerometers, gyroscopes, load cells, optical sensors, and the like. The joystick 500 is normally positioned in a central position in which post member 502 extends in a generally vertical direction with respect to the floor surface 99 from the first end 504 to the second end 506. The application of a force in a direction normal to the length of the joystick 500 (shown as, for example, V1-V8 in FIG. 10B) urges the joystick 500 away from vertical. Throttle control and the associated speed or acceleration of the motor 102 may be proportional to the force applied by the user. Any suitable relationship between the force and speed, acceleration, etc., can be used for throttle control. Alternatively, the force detected by the load cell 310 may indicate direction of desired movement with a separate throttle control being used for speed control.

In addition, the mode switch 252 comprises a rotatable dial 575 that is positioned on the support structure 22. The rotatable dial 575 is the equivalent of the rotatable dial 275 illustrated in FIGS. 6A-6C and has three positions, including a neutral dial position ("N"), a longitudinal transport mode dial position ("Mode 1"), and a multidirectional mode dial position ("Mode 2").

When the user desires to move the patient transport apparatus 20 in the forward linear direction D1 or rearward linear direction D2, for example, the user moves the rotatable dial 575 to the longitudinal transport mode ("Mode 1"), which generates the first signal sent to the controller 126. In addition, the user applies a forward force (shown as V1 in FIG. 10B) or a rearward force (shown as V2 in FIG. 10B) on the joystick 500. The load cell 310 senses the applied force on the joystick 500 and generates an engaged signal that is sent to the controller 126. Moreover, the user may steer/turn the patient transport apparatus 20 around a corner in the longitudinal transport mode as described above by applying a rotational torque (see J1/J2 in FIG. 10B) to the joystick 500 depending on the direction of the desired turn, which may cause differential speeds of the drive wheels 64 (e.g., when at least a pair of drive wheels 64 are used) to assist in the turn.

When the user wishes for powered driving assistance via the motor 102 of the powered drive system 90 to assist in moving the patient transport apparatus 20 in a transverse linear direction (e.g., one of the transverse linear directions D3-D8 as described and illustrated with respect to FIG. 4C above), the user rotates the rotatable dial 575 to the multidirectional mode ('Mode 2"), which generate the second signal sent to the controller 126. The user then applies a force in a direction transverse to the forward force V1 or rearward force V2 (shown as one of applied transverse forces V3-V8 also shown in FIG. 10B), thereby causing the joystick 500 to be urged in the direction of the applied transverse force V3-V8. The load cell 310 senses the force applied to the joystick 500 and generates the engaged signal that is sent to the controller 126. The direction of force on the joystick 500 detected by the load cell 310 in turn corresponds to the detected direction that is determined by the controller 126 so that the controller 126 can command the swivel actuator 71 to turn the drive wheels 64 in the direction of desired movement.

When the user desires to rotate the patient transport apparatus 20 in a clockwise direction or counterclockwise direction in the multidirectional mode, the user rotates the joystick 500 in a clockwise direction (shown as J1 in FIG. 10B) or a counterclockwise direction (shown as J2 in FIG. 10B) about the steering axis 501. The rotation J1 or J2 is sensed by the load cell 310, which generates the engaged signal sent to the controller 126.

In certain embodiments, as also shown in FIG. 10B, the joystick 500 also includes a neutral button 507 and a stop button 509, each coupled to the controller 126, and positioned along a base portion of the joystick 500. The actuation of the stop button 509 by the user, such as by depressing the stop button 509, generates a stop signal that is sent to the controller 126. Upon receipt of the stop signal, the controller 126 generates an output signal that prevents the driving assist device 254 from providing power assist in moving the patient transport apparatus 20 by one or more of: (1) directing the lift actuator 66 to move the at least drive wheel 64 to the retracted position; (2) directing the powered drive system 90 to refrain from providing power assistance via the motor 102; (3) applying brakes on the at least one drive wheel 64; and/or (4) applying brakes on the support wheels 56 (the brakes could be electronically actuated brakes).

Conversely, the actuation of the neutral button 507 by the user, such as by depressing the neutral button 507, generates a neutral signal that is sent to the controller 126 that causes the lift actuator 66 to retract the at least one drive wheel 64 so that the user can move the patient transport apparatus 20 manually. The neutral button 507 could be used to replace the neutral mode on the rotatable dial 575.

Figure 11:
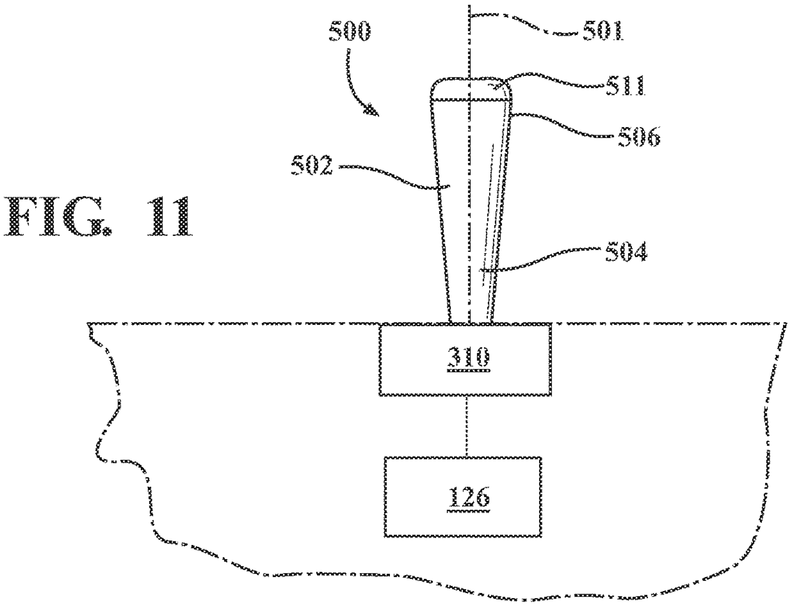
FIG. 11 is a perspective view of a user input control and controller according to another embodiment including a joystick.

Referring now to FIG. 11, in yet another embodiment, the driving assist device 254 may comprise a joystick 500 positioned on the support structure 22 in an alternative configuration in which the mode switch 252 is in the form of a touch sensor 511, e.g., a capacitive sensor, or other type of sensor coupled to the second end 506 of the joystick. In this embodiment, to switch between the longitudinal transport mode and the multidirectional mode, as opposed to rotating the dial 575 as in FIG. 10A, the user simply contacts the touch sensor 511. More specifically, the user contacts the touch sensor 511 once to enter the longitudinal transport mode (which sends the first signal to the controller 126), and then again to enter the multidirectional mode. To return to the longitudinal transport mode, the user contacts the touch sensor 511 again (which sends the second signal to the controller 126). Accordingly, each consecutive depression of the touch sensor 511 toggles the joystick 500 between the longitudinal transport mode and the multidirectional mode. The user may then apply a particular force V1-V8 or rotational torque J1-J2 to the joystick 500 in order to initiate the power assist feature in the manner described above in FIG. 10.

Figure 12:
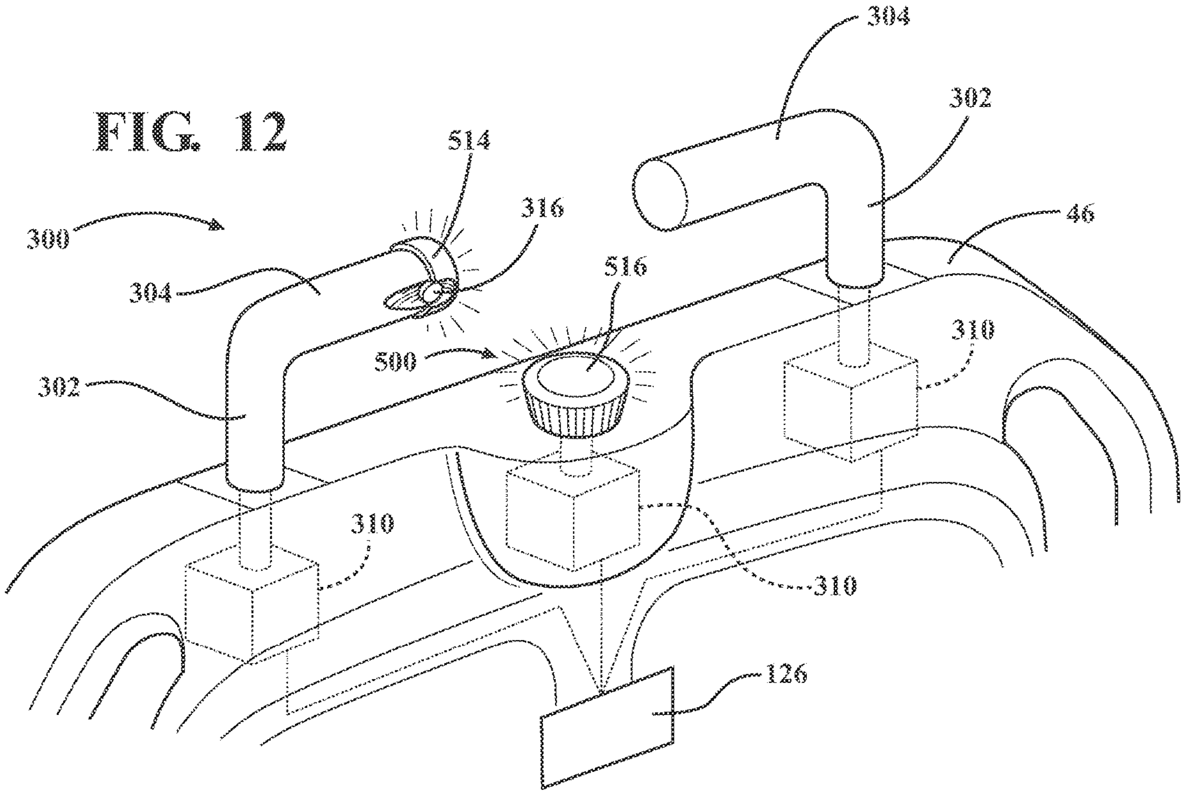
FIG. 12 is a perspective view of a user input control and controller according to another embodiment including a pair of handle members and a joystick.

Referring now to FIG. 12, in yet another embodiment, the driving assist device 254 is in the form of a combination of the handle members 300 from FIG. 7 and the joystick 500 from FIG. 11 (joystick in this embodiment is puck-shaped). In one version, the handle members 300 are utilized during manual movement of the patient transport apparatus 20 and in the longitudinal transport mode, as described with respect to FIG. 7 and the joystick 500 is utilized solely in the multidirectional mode, as described above with respect to FIGS. 10A and 10B. The joystick 500 in this embodiment could be located between the handle members 300, coupled to one of the handle members 300, such as coupled to the end of one of the graspable handles 304, or located elsewhere on the patient transport apparatus 20.

In this embodiment, the mode switch 252 further comprises a touch sensor 316 that is accessible via a user's thumb in a pocket defined in one of the graspable handles 304. Of course, other forms of mode switch 252 could also be employed. Visual indicators 514, 516 (shown as light indicator rings) may be coupled to the controller 126 to indicate which mode and associated driving assist device 254 is active. The visual indicators 514, 516 may comprise one or more light emitting diodes or LEDs, such as multi-colored LEDs. The visual indicator 514, which is coupled to one or both of the handle members 300, could be activated to emit light when in the longitudinal transport mode and the visual indicator 516, which is coupled to the joystick 500, could be activated to emit light when in the multidirectional mode. In some cases, when one of the modes is active, only one of the visual indicators 514, 516 emits light. In other cases, the visual indicators 514, 516 may both emit light, but of different colors. For example, in the longitudinal transport mode, the visual indicator 514 may emit green or blue light to indicate being active and the visual indicator 516 may emit red or orange light to indicate being inactive, and vice versa for the multidirectional mode. Other combinations of lighting schemes or visual indications of the active/inactive modes are also contemplated.

In this embodiment, in order to enter the longitudinal transport mode, the user contacts the touch sensor 316, which sends the first signal to the controller 126 and activates the visual indicator 514 as described. The handle members 300 are now active and the joystick 500 is inactive. Manual force is then applied by the user to the pair of handle members 300 to provide power assistance in the manner previously described above. To enter the multidirectional mode, the user contacts the touch sensor 511, which sends the second signal to the controller 126. The joystick 500 is now active and the handle members 300 become inactive. The user may then apply a particular force V1-V8 or rotational torque J1-J2 to the joystick 500 in order to initiate the power assist feature in the manner described above in FIGS. 10A, 10B, and 11.

Figure 13:
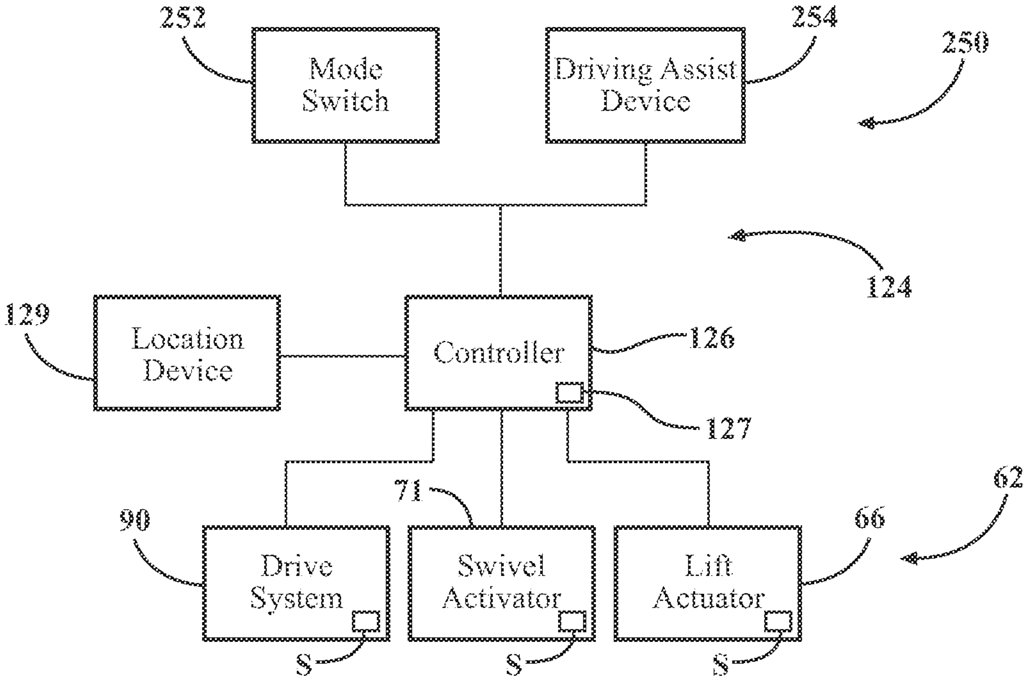
FIG. 13 is a schematic illustration of the electrical connection of the mode switch, the driving assist device, the controller, the drive system, and the lift actuator.

Referring to FIG. 13, in still further embodiments, the patient transport apparatus may also include a location device 129 that is coupled to the controller 126 of the patient transport apparatus 20 that provides further control of the powered drive system 90 to assist the user in propelling the patient transport apparatus 20 by placing the patient transport apparatus 20 in either the longitudinal transport mode or in the multidirectional mode depending upon a sensed location.

The location device 129, in certain embodiments, functions to provide the controller 126 with information regarding the location of the patient transport apparatus 20 relative to a building or room or alternatively functions to provide information regarding the location of objects present in the building or room relative to the patient transport apparatus 20.

The location device 129 may be a global positioning satellite (GPS) device or similar device that is remotely coupled to the controller 126 which can identify the relative location of the patient transport apparatus 20 in the building or room and send the location signal to the controller 126 on the basis of the identified location.

The location device 129 may also be in the form of a sensor that is coupled to the patient transport apparatus 20 that can sense objects (dynamic or static objects) in proximity to the patient transport apparatus 20 and send the location signal to the controller 126 that identifies the location of such dynamic or static objects. Alternatively, the sensors may be located within the buildings or rooms in which the patient transport apparatus 20 is located and function to sense the relative location of the patient transport apparatus 20 within the respective building or room and with respect to the sensed dynamic or static objects. Sensed objects may be in the form of inanimate objects such as walls, carts, boxes, or the like, as well as animate objects such as people. The sensors may come in many forms, such as a visible light camera, an infrared camera, a radar, proximity sensors, or the like.

The location device 129 generates a location signal that is sent to the controller 126 on the basis of the sensed location of the patient transport apparatus 20, or on the basis of the sensed object's location relative to the location of the patient transport apparatus 20. The controller 126 receives the location signal and in turn generates an output signal that will automatically switch between modes, maintain the current mode, or limit switching to a different mode, on the basis of the sensed location. Such sensed locations, for example, might be in tight spaces such as elevators, or in hospital rooms, where it is desirable to limit the speed of the motor 102 of the powered drive system 90 to speeds associated with the multidirectional mode, as described above. For example, when the patient transport apparatus 20 is in or near an elevator or in a patient room, the controller 126 may lockout the user's ability to switch to the longitudinal transport mode to avoid moving at high speeds, but may allow movement in the multidirectional mode, which may have a lower maximum speed as described above. Similarly, the controller 126 may automatically switch or enable switching to the longitudinal transport mode once the patient transport apparatus 20 is outside of the elevator or the patient's room.

By maintaining the patient transport apparatus 20 in the multidirectional mode on the basis of the generated sensed location signal, the power assist feature of the patient transport apparatus 20 will limit the speed in which the powered drive system 90 commands the motor 102 to assist the user in propelling the patient transport apparatus 20, thus allowing the user to better and more safely control the movement of the patient transport apparatus 20 in these circumstances. Stated another way, the location device 129 provides an environmental awareness aspect to the powered drive system 90 of the patient transport apparatus 20 by controlling switching (or the enablement of such switching) between the longitudinal transport mode and the multidirectional mode that aids a user in safely and efficiently transporting a patient in particular locations.

Other forms of handles with load cells, potentiometers, or other sensors, could act as the driving assist devices 254 and be located anywhere on the patient transport apparatus 20, as described in U.S. Patent Application Publication No. 2016/0089283, filed on Dec. 10, 2015, entitled, "Patient Support Apparatus," the entire contents of which are hereby incorporated herein by reference. Similarly, the headboard 46, footboard 48, and/or side rails 38, 40, 42, 44, themselves could act as the driving assist devices 254 in combination with one or more load cells sensing forces applied thereon, as described in U.S. Patent Application Publication No. 2016/0089283, filed on Dec. 10, 2015, entitled, "Patient Support Apparatus," the entire contents of which are hereby incorporated herein by reference.

In some versions, electronic actuation of brakes and/or steer lock may be integrated into any of the handle members 300, the T-bar handle 400, the joystick 500, and the like, such as by using some form of brake/steer lock actuators, e.g., touch sensors, switches, pushbuttons, etc. that place the support wheels 56 in a braked or unbraked state and may place one or more of the support wheels 56 in a steer locked state.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus moveable along a floor surface, the patient transport apparatus comprising:

a support structure;

a plurality of support wheels coupled to the support structure;

a drive wheel assembly comprising a pair of drive wheels and a powered drive system coupled to the pair of drive wheels;

a driving assist device actuatable between at least one engaged state and a non-engaged state;

a sensor system to determine current speeds of the pair of drive wheels; and a controller coupled to the powered drive system, the driving assist device, and the sensor system, the controller being configured to determine if the driving assist device is in the at least one engaged state or the non-engaged state, compare the current speeds relative to a first maximum speed and to a second maximum speed lower than the first maximum speed, generate a first command to drive the pair of drive wheels to assist in propelling the patient transport apparatus along a floor surface in a longitudinal direction in response to the driving assist device being in the at least one engaged state and the current speeds being higher than the second maximum speed, and generate a second command to drive the pair of drive wheels in a counter-rotating manner or at different rotational speeds to assist in maneuvering the patient transport apparatus transverse to the longitudinal direction in response to the driving assist device being in the at least one engaged state and the current speeds being lower than the second maximum speed.

2. The patient transport apparatus of claim 1, wherein the controller is further configured to control the pair of drive wheels to limit the current speeds to the first maximum speed.

3. The patient transport apparatus of claim 1, wherein the powered drive system includes a pair of motors each associated with a respective one of the pair of drive wheels.

4. The patient transport apparatus of claim 1, wherein the driving assist device comprises a pair of handle members and an engageable throttle control.

5. The patient transport apparatus of claim 1, wherein the driving assist device further comprises an engageable throttle control.

6. The patient transport apparatus of claim 1, wherein the driving assist device further comprises a load cell.

7. The patient transport apparatus of claim 1, wherein the driving assist device comprises a T-bar handle, the T-bar handle including a first bar coupled to the support structure at a lower end and extending along its length from the lower end to an upper end, the T-bar handle further including a second bar coupled to the upper end of the first bar and extending transverse to the first bar between a first end and a second end, the length of the first bar from the lower end to the upper end defining a steering axis.

8. The patient transport apparatus of claim 7, wherein the driving assist device comprises a load cell responsive to forces applied to the T-bar handle.

9. The patient transport apparatus of claim 1, wherein the driving assist device comprises a joystick coupled to the support structure and movable in a plurality of directions relative to the support structure.

10. The patient transport apparatus of claim 9, wherein the joystick is rotatable about a steering axis.

11. The patient transport apparatus of claim 1, wherein the drive wheel assembly comprises a lift actuator coupled to the pair of drive wheels and configured to move the pair of drive wheels between a deployed position and a retracted position.

12. The patient transport apparatus of claim 1, wherein the drive wheel assembly comprises a swivel actuator to swivel the pair of drive wheels about a swivel axis between a non-swiveled position and a swiveled position.

13. The patient transport apparatus of claim 1, wherein the sensor system is further configured to determine one or more of a current position of the pair of drive wheels, and a current orientation of the pair of drive wheels.

14. The patient transport apparatus of claim 1, further comprising a mode switch coupled to the controller and selectively operable in:

a multidirectional mode to permit driving the pair of drive wheels to assist in propelling the patient transport apparatus transverse to the longitudinal direction in response to the current speeds determined by the sensor system being below the second maximum speed, and a longitudinal transport mode to inhibit operation in the multidirectional mode and to permit driving the pair of drive wheels to assist in propelling the patient transport apparatus in the longitudinal direction.

15. The patient transport apparatus of claim 14, comprising a location device coupled to the controller to generate a location signal to be sent to the controller to identify a location of the patient transport apparatus relative to one or more of a building, room, or object, wherein the controller is configured to one or more of: automatically switch between the longitudinal transport mode and the multidirectional mode based on the location signal and limit switching between the longitudinal transport mode and the multidirectional mode, based on the location signal.

16. The patient transport apparatus of claim 14, wherein the mode switch is also selectively operable in a neutral mode.

17. The patient transport apparatus of claim 14 wherein the mode switch comprises a rotatable dial coupled to the support structure, the rotatable dial movable between:

a longitudinal transport mode dial position associated with the longitudinal transport mode, and a multidirectional mode dial position associated with the multidirectional mode.

18. The patient transport apparatus of claim 14, wherein the mode switch comprises a rotatable dial, the rotatable dial movable between a neutral dial position, a longitudinal transport mode dial position, and a multidirectional mode dial position.

19. The patient transport apparatus of claim 14, wherein the mode switch comprises a touch sensor.

* * * * *